US012792270B2

(12) United States Patent
Nagasaka

(10) Patent No.: US 12,792,270 B2
(45) Date of Patent: Nov. 10, 2026

(54) MEMORY SYSTEM

(71) Applicant: Kioxia Corporation, Tokyo (JP)

(72) Inventor: Toshiro Nagasaka, Hamura (JP)

(73) Assignee: Kioxia Corporation, Tokyo (JP)

(*) Notice: Subject to any disclaimer, the term of this patent is extended or adjusted under 35 U.S.C. 154(b) by 0 days.

(21) Appl. No.: 19/007,686

(22) Filed: Jan. 2, 2025

(65) Prior Publication Data

US 2025/0138754 A1 May 1, 2025

Related U.S. Application Data

(62) Division of application No. 17/806,841, filed on Jun. 14, 2022, now Pat. No. 12,229,443.

(30) Foreign Application Priority Data

Nov. 19, 2021 (JP) ................................ 2021-188680

(51) Int. Cl.
*G06F 3/06* (2006.01)

(52) U.S. Cl.
CPC .......... *G06F 3/0659* (2013.01); *G06F 3/0607* (2013.01); *G06F 3/0679* (2013.01)

(58) Field of Classification Search
CPC .... G06F 3/0659; G06F 3/0656; G06F 3/0653; G06F 11/3419
See application file for complete search history.

(56) References Cited

U.S. PATENT DOCUMENTS 5,914,936 A * 6/1999 Hatono .............. H04Q 11/0478 370/244
9,658,822 B1 * 5/2017 O'Connor ................ G06F 5/14
10,387,078 B1 8/2019 Benisty
11,055,028 B1 7/2021 Kamran et al.
2018/0188952 A1 7/2018 Carlton
2019/0042142 A1 2/2019 Casmira
2019/0278523 A1 9/2019 Benisty
2021/0081135 A1 3/2021 Troy
2021/0149599 A1 5/2021 Kajihara et al.

FOREIGN PATENT DOCUMENTS

JP 2021-81858 A 5/2021

* cited by examiner

*Primary Examiner* — Gary W. Cygiel
(74) *Attorney, Agent, or Firm* — Oblon, McClelland, Maier & Neustadt, L.L.P.

(57) ABSTRACT

According to one embodiment, a memory system includes a nonvolatile memory, a storage area, and a controller. The controller acquires a request from a submission queue included in a host, generates one or more commands to be executed by the nonvolatile memory in accordance with the request, and stores the commands to the storage area. The controller controls throttling of acquisition of requests from the submission queue in accordance with the number of commands in the storage area and the number of requests in the submission queue.

20 Claims, 12 Drawing Sheets

MEMORY SYSTEM

CROSS-REFERENCE TO RELATED APPLICATIONS

This application is a division of and claims benefit under 35 U.S.C. § 120 to U.S. application Ser. No. 17/806,841, filed Jun. 14, 2022, which is based upon and claims the benefit of priority from Japanese Patent Application No. 2021-188680, filed Nov. 19, 2021, the entire contents of which are incorporated herein by reference.

FIELD

Embodiments described herein relate generally to a technique for controlling a nonvolatile memory.

BACKGROUND

In recent years, memory systems that include a nonvolatile memory are widely used. As one of such memory systems, a solid state drive (SSD) that includes a NAND flash memory is known. The SSD is used as a main storage for various computing devices.

The memory system performs a process on the nonvolatile memory in accordance with a request (for example, a command) received from a host.

More specifically, the host may include multiple submission queues (SQs). Each of the submission queues is capable of storing one or more requests to be executed in the memory system.

The memory system receives a request from the host by acquiring (more specifically, fetching) the request from each of the submission queues. Then, the memory system performs processing according to the received request.

The memory system may perform control for evenly receiving requests from the submission queues.

DETAILED DESCRIPTION

Figure 1:
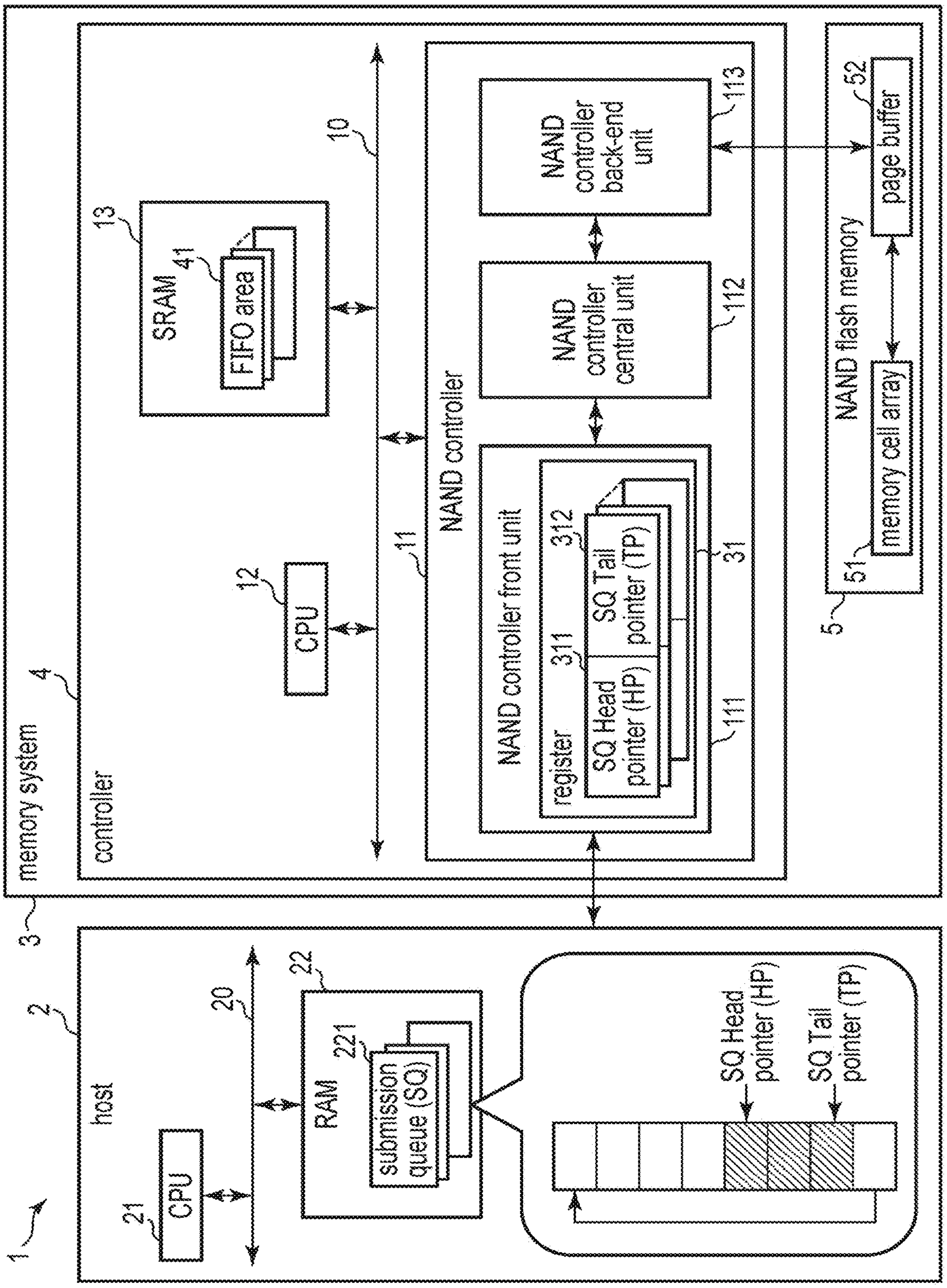
FIG. 1 is a block diagram illustrating an example of a configuration of an information processing system that includes a memory system according to a first embodiment.

Various embodiments will be described hereinafter with reference to the accompanying drawings.

In general, according to one embodiment, a memory system includes a nonvolatile memory, a storage area, and a controller. The controller acquires a request from a first submission queue included in a host. The controller generates one or more commands to be executed by the nonvolatile memory in accordance with the acquired request. The controller stores the generated one or more commands to the storage area. The controller causes the nonvolatile memory to execute a process according to each of the one or more commands stored in the storage area. The controller controls throttling of acquisition of requests from the first submission queue in accordance with the number of commands stored in the storage area and the number of requests stored in the first submission queue.

First Embodiment

First, a configuration of an information processing system 1 that includes a memory system according to a first embodiment will be described with reference to FIG. 1. The information processing system 1 includes a host device 2 (hereinafter, referred to as a host 2) and a memory system 3.

The host 2 may be a storage server that stores a large amount of various data in the memory system 3, or may be a personal computer.

The memory system 3 is a semiconductor storage device configured to write data to a nonvolatile memory, such as a NAND flash memory, and read data from the nonvolatile memory. The memory system 3 is also referred to as a storage device. The memory system 3 is realized as, for example, a solid state drive (SSD).

The memory system 3 may be used as a storage of the host 2. The memory system 3 may be provided inside the host 2 or may be connected to the host 2 via a cable or a network.

An interface for connecting the host 2 and the memory system 3 conforms to standards such as PCI Express (PCIe) (registered trademark), Ethernet (registered trademark), Fibre channel, or NVM Express (NVMe) (registered trademark).

The host 2 includes, for example, a central processing unit (CPU) 21 and a random access memory (RAM) 22. The CPU 21 and the RAM 22 may be connected via a bus 20.

The CPU 21 is, for example, at least one processor. The CPU 21 controls operations of various components of the host 2.

The RAM 22 is a volatile memory. The RAM 22 is realized as, for example, a dynamic random access memory (DRAM) or a static random access memory (SRAM).

The host 2 may include multiple submission queues 221. For example, a storage area of the RAM 22 is allocated to each of the submission queues 221. Each submission queue 221 is a queue for storing a request that is issued from the host 2 (more specifically, the CPU 21) to the memory system 3. That is, the host 2 transmits a request to the memory system 3 via the submission queue 221. The request is, for example, a command. Hereinafter, a command based on a request from the host 2 is referred to as a host command. Each submission queue 221 includes multiple slots to which the host 2 writes host commands, respectively, which are to be issued to the memory system 3. A location in the submission queue 221 (that is, a slot) to which the host 2 should write a host command is indicated by an SQ Tail pointer (TP). A location in the submission queue 221 from which the memory system 3 should fetch a host command is indicated by an SQ Head pointer (HP).

The host 2 writes a host command (that is, issues the host command) at a location in the submission queue 221 that is indicated by the SQ Tail pointer. Then, the host 2 adds one to the SQ Tail pointer. When the value obtained by adding one to the SQ Tail pointer reaches the number of slots in the submission queue 221 (that is, the queue size), the host 2 sets the SQ Tail pointer to zero. Then, the host 2 writes the updated value of the SQ Tail pointer into an SQ Tail doorbell register of the memory system 3.

In the example illustrated in FIG. 1, three host commands are stored in the submission queue 221. The number of host commands stored in the submission queue 221 corresponds to a difference between the SQ Head pointer and the SQ Tail pointer.

The memory system 3 includes, for example, a controller 4 and a NAND flash memory 5. The memory system 3 may further include a dynamic random access memory (DRAM).

The NAND flash memory 5 includes a memory cell array 51 and a page buffer 52. The memory cell array 51 includes multiple blocks each including memory cells that are disposed in a matrix. The blocks each function as a minimum data erase unit. The block may also be referred to as an erasure block or a physical block. Each of the blocks includes multiple pages. Each of the pages includes memory cells connected to a single word line. The pages each function as a unit of a data write operation and a data read operation. Note that a word line may function as a unit of a data write operation and a data read operation.

The page buffer 52 is composed of, for example, a static random access memory (SRAM). The page buffer 52 temporarily stores data transferred between the controller 4 and the NAND flash memory 5.

In a data write operation, data received from the controller 4 is temporarily stored in the page buffer 52 and then programmed into the memory cell array 51. Hereinafter, an operation of temporarily storing data, which is received from the controller 4, to the page buffer 52 is referred to as a data-in operation. An operation of programming data, which is temporarily stored in the page buffer 52, into the memory cell array 51 is referred to as a program operation.

In a data read operation, data read from the memory cell array 51 is temporarily stored in the page buffer 52 and then output to the controller 4. Hereinafter, an operation of temporarily storing data, which is read from the memory cell array 51, to the page buffer 52 is referred to as a sense operation. An operation of outputting data, which is temporarily stored in the page buffer 52, to the controller 4 is referred to as a data-out operation.

The tolerable maximum number of program/erase cycles (maximum number of P/E cycles) for each of the blocks is limited. One P/E cycle of a block includes a data erase operation to erase data stored in all memory cells in the block and a data write operation to write data in each page of the block.

The controller 4 may be realized by a circuit such as a system-on-a-chip (SoC). The controller 4 functions as a memory controller configured to control the NAND flash memory 5.

The controller 4 may function as a flash translation layer (FTL) configured to execute data management and block management of the NAND flash memory 5. The data management executed by the FTL includes (1) management of mapping data indicative of relationship between each logical address and each physical address of the NAND flash memory 5, and (2) process to hide a difference between read/write operations executed in units of page and erase operations executed in units of block. The block management includes management of defective blocks, wear leveling, and garbage collection.

The logical address is used by the host 2 for addressing a storage area of the memory system 3. The logical address is, for example, a logical block address (LBA).

Management of mapping between each logical address and each physical address is executed using, for example, a logical-to-physical address conversion table. The controller 4 uses the logical-to-physical address conversion table to manage the mapping between each logical address and each physical address with a certain management size. A physical address corresponding to a logical address indicates a physical memory location in the NAND flash memory 5 to which data of the logical address is written. The controller 4 manages multiple storage areas that are obtained by logically dividing the storage area of the NAND flash memory 5, using the logical-to-physical address conversion table. The multiple storage areas correspond to multiple logical addresses, respectively. That is, each of the storage areas is specified by one logical address. The logical-to-physical address conversion table may be loaded from the NAND flash memory 5 to the DRAM (not shown) when the memory system 3 is powered on.

Data write into one page is executable only once in a single P/E cycle. Thus, the controller 4 writes updated data corresponding to a logical address not to an original physical memory location in which previous data corresponding to the logical address is stored but to a different physical memory location. Then, the controller 4 updates the logical-to-physical address conversion table to associate the logical address with the different physical memory location than the original physical memory location and to invalidate the previous data. Data to which the logical-to-physical address conversion table refers (that is, data associated with a logical address) will be referred to as valid data. Furthermore, data not associated with any logical address will be referred to as invalid data. The valid data is data to possibly be read by the host 2 later. The invalid data is data not to be read by the host 2 anymore.

The controller 4 includes, for example, a NAND controller 11, a CPU 12, and a static random access memory (SRAM) 13. The NAND controller 11, the CPU 12, and the SRAM 13 are connected via, for example, a bus 10.

The SRAM 13 is a volatile memory. The storage area of the SRAM 13 is allocated as, for example, first-in first-out (FIFO) storage areas 41. Hereinafter, the FIFO storage area 41 is also referred to as a FIFO area 41. The FIFO area 41 stores information of a specific unit in a FIFO manner. The information of the specific unit is, for example, a NAND command to be described later.

The FIFO areas 41 are associated with the submission queues 221, respectively, which are included in the host 2. That is, the FIFO areas 41 and the submission queues 221 in the host 2 correspond on a one-to-one basis. In a FIFO area 41, a NAND command corresponding to a host command that is fetched from the submission queue 221 corresponding to the FIFO area 41 is stored. In the FIFO area 41, NAND commands for which corresponding processing has not been executed yet may be accumulated. One or more NAND commands stored in the FIFO area 41 are processed by the NAND controller 11 in the order of their storage (that is, in the order of acquisition according to the FIFO manner). The processed NAND command is discarded from the FIFO area 41. When one NAND command is discarded, the number of NAND commands stored in the FIFO area 41 decreases by one.

Note that the multiple FIFO areas 41 may be provided in multiple SRAMs. Alternatively, multiple volatile FIFO memories may be provided instead of the SRAM 13 that includes the multiple FIFO areas 41.

The NAND controller 11 is configured to control various processes for the NAND flash memory 5. The NAND controller 11 includes a NAND controller front unit 111, a NAND controller central unit 112, and a NAND controller back-end unit 113.

The NAND controller front unit 111 receives various host commands, for example, input/output (I/O) commands and various control commands from the host 2 via the submission queues 221. The I/O commands may include a write command, a read command, and a verify command. The control commands may include an unmap command (also referred to as a trim command) and a format command. The format command is a command for unmapping the entire memory system 3.

The NAND controller front unit 111 includes a register 31. The register 31 is a storage area for temporarily storing data. The storage area of the register 31 is allocated as, for example, a storage area of an SQ Head pointer 311 and the SQ Tail doorbell register. A value of the SQ Tail pointer managed by the host 2 is written into the SQ Tail doorbell register. Hereinafter, the value stored in the SQ Tail doorbell register in the register 31 is referred to as an SQ Tail pointer 312.

In a case where the host 2 includes the multiple submission queues 221, multiple sets of the SQ Head pointer 311 and the SQ Tail pointer 312 are stored in the register 31. Each of the sets of the SQ Head pointer 311 and the SQ Tail pointer 312 stored in the register 31 is associated with any one of the submission queues 221 in the host 2. The sets of the SQ Head pointer 311 and the SQ Tail pointer 312 may be stored in a volatile memory such as the SRAM 13 instead of the register 31.

The NAND controller front unit 111 uses the SQ Head pointer 311 and the SQ Tail pointer 312 to manage the number of host commands that are stored in the corresponding submission queue 221. Specifically, the NAND controller front unit 111 calculates the number of host commands stored in the corresponding submission queue 221 on the basis of the difference between the SQ Head pointer 311 and the SQ Tail pointer 312.

The NAND controller central unit 112 generates one or more NAND commands that correspond to a host command received by the NAND controller front unit 111. When the host command is a write command, the NAND controller central unit 112 generates, as NAND commands, a data-in command that instructs the NAND flash memory 5 to perform a data-in operation and a program command that instructs the NAND flash memory 5 to perform a program operation. When the host command is a read command, the NAND controller central unit 112 generates, as NAND commands, a sense command that instructs the NAND flash memory 5 to perform a sense operation and a data-out command that instructs the NAND flash memory 5 to perform a data-out operation. The NAND command generated by the NAND controller central unit 112 is not limited thereto.

The NAND controller central unit 112 stores the generated NAND commands to the FIFO area 41. The FIFO area 41 to which the NAND commands are stored corresponds to the submission queue 221 from which the host command corresponding to the NAND commands has been fetched. The NAND controller central unit 112 controls processes for the NAND flash memory 5 that correspond to one or more NAND commands, respectively, which are stored in each FIFO area 41, so that the processes are performed in the same order as that the one or more NAND commands are stored in the FIFO area 41.

The NAND controller central unit 112 manages the number of NAND commands that are stored in each of the FIFO areas 41. The NAND controller central unit 112 controls issuance of an interrupt to the CPU 12 on the basis of the number of NAND commands stored in a FIFO area 41 and the number of host commands stored in the submission queue 221 that corresponds to the FIFO area 41. This interrupt is an interrupt for controlling throttling of host commands that are acquired from the submission queue 221.

The NAND controller back-end unit 113 electrically connects the controller 4 and the NAND flash memory 5. The NAND controller back-end unit 113 conforms to an interface standard such as a toggle double data rate (DDR) and an open NAND flash interface (ONFI).

The NAND controller back-end unit 113 functions as a NAND control circuit configured to control the NAND flash memory 5. The NAND controller back-end unit 113 may be connected to memory chips in the NAND flash memory 5 via multiple channels (Ch). By operating the memory chips in parallel, it is possible to broaden an access bandwidth between the controller 4 and the NAND flash memory 5.

The CPU 12 is a processor configured to control the NAND controller 11 and the SRAM 13. The CPU 12 performs various processes by executing a firmware (FW). The FW is a control program that includes instructions for causing the CPU 12 to execute various processes. The operation of the CPU 12 is controlled by the FW executed by the CPU 12. The CPU 12 executes a process in accordance with an interrupt issued by each unit in the controller 4.

The function of each unit in the controller 4 may be realized by dedicated hardware in the controller 4 or may be realized by the CPU 12 executing the FW.

Figure 2:
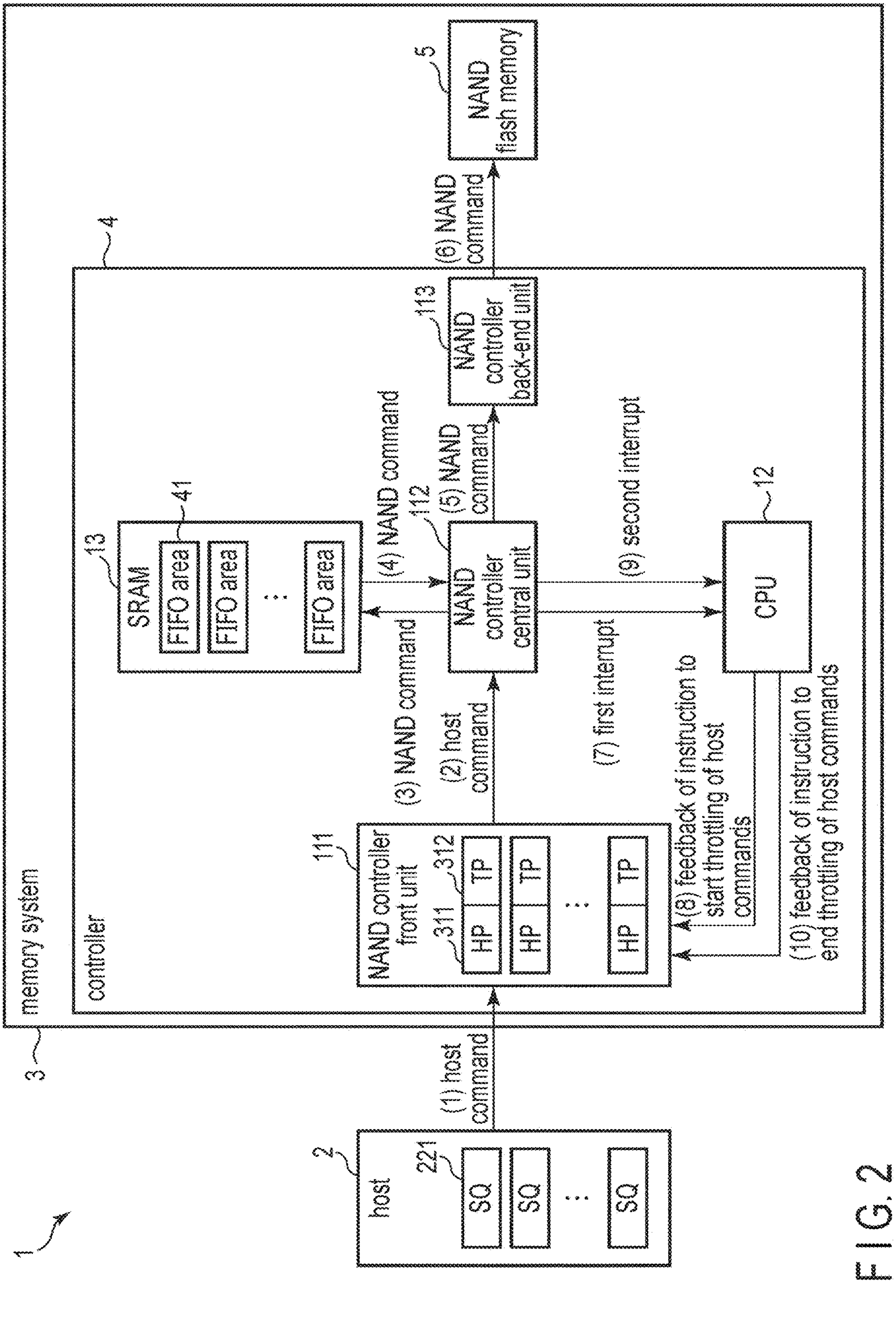
FIG. 2 is a diagram illustrating a first operation example in the memory system according to the first embodiment.

FIG. 2 illustrates an example of an operation in the memory system 3.

The NAND controller front unit 111 acquires a host command from the submission queues 221 ((1) in FIG. 2). Specifically, the NAND controller front unit 111 selects one submission queue 221 from the submission queues 221 in the host 2 according to an arbitration mechanism. The selected submission queue 221 is a submission queue 221 from which a host command is to be fetched. As the arbitration mechanism, for example, round robin or weighted round robin, which are defined in the NVMe standard, is used.

When there is a difference between the SQ Head pointer 311 and the SQ Tail pointer 312 that correspond to the selected submission queue 221, the submission queue 221 stores a host command to be fetched.

When there is a difference between the SQ Head pointer 311 and the SQ Tail pointer 312 that correspond to the selected submission queue 221, the NAND controller front unit 111 fetches the host command from a location in the submission queue 221 that is indicated by the SQ Head pointer 311. The NAND controller front unit 111 sends the fetched host command to the NAND controller central unit 112 ((2) in FIG. 2). The NAND controller front unit 111 adds one to the SQ Head pointer 311. When the value obtained by adding one to the SQ Head pointer 311 reaches the number of slots in the submission queue 221, the NAND controller front unit 111 sets the SQ Head pointer 311 to zero.

The NAND controller central unit 112 generates one or more NAND commands that correspond to the host command sent by the NAND controller front unit 111, and stores the generated NAND commands to the FIFO area 41 ((3) in FIG. 2). The FIFO area 41 to which the NAND commands are stored corresponds to the submission queue 221 from which the host command corresponding to the NAND commands has been fetched.

The NAND controller central unit 112 controls execution of processing according to a NAND command stored in each of the FIFO areas 41. Specifically, the NAND controller central unit 112 acquires a NAND command to be executed next from the FIFO area 41 according to the process on the NAND flash memory 5 ((4) in FIG. 2). The NAND controller central unit 112 sends the acquired NAND command to the NAND controller back-end unit 113 ((5) in FIG. 2). When a logical address is designated in the acquired host command, the NAND controller central unit 112 may convert the logical address into a physical address using the logical-to-physical address conversion table. The NAND controller central unit 112 may send the NAND command and a parameter related to the NAND command (for example, the physical address) to the NAND controller back-end unit 113. In addition, for example, when the acquired host command is a write command, the NAND controller central unit 112 may transfer user data, which is to be written in accordance with the write command, from the host 2 to a data buffer (not illustrated) in the memory system 3.

The NAND controller back-end unit 113 sends one or more NAND commands, parameters, data, and the like to the NAND flash memory 5 (more specifically, the NAND flash memory chip) ((6) in FIG. 2). As a result, in the NAND flash memory 5, an operation according to the NAND commands is performed.

For example, in a case where a data-in command is generated by the NAND controller central unit 112, the NAND controller back-end unit 113 sends, to the NAND flash memory 5, the data-in command, a serial input command, a physical address of a write destination, and user data to be written. As a result, the sequence of a data-in operation is performed in the NAND flash memory 5.

Here, influence on the host command process by an increase in the number of NAND commands stored in a FIFO area 41 will be described.

When the number of NAND commands in a FIFO area 41 increases, time until the processing of a host command, which has been issued via the corresponding submission queue 221, is completed may lengthen.

In addition, a deviation may become large between the number of host commands fetched (and processed in the controller 4) from the submission queue 221 corresponding to the FIFO area 41 that stores a large number of NAND commands and the number of host commands fetched (and processed in the controller 4) from the submission queue 221 corresponding to the FIFO area 41 that stores a small number of NAND commands. That is, there is a possibility that processing corresponding to a host command acquired from a specific submission queue 221 is intensively performed.

In order to strike a balance of the numbers of host commands to be processed in the controller 4 among the submission queues 221, for example, it is conceivable to control throttling of host commands acquired from the corresponding submission queue 221 in accordance with the number of NAND commands stored in each of the FIFO areas 41.

In this case, the NAND controller central unit 112 monitors the number of NAND commands stored in each of the FIFO areas 41. When there is a FIFO area 41 in which the number of NAND commands has exceeded an upper limit, the NAND controller central unit 112 issues a first interrupt and sends the first interrupt to the CPU 12 ((7) in FIG. 2). The FIFO area 41 in which the number of NAND commands has exceeded the upper limit is referred to as a target FIFO area 41. The submission queue 221 corresponding to the target FIFO area 41 is referred to as a target submission queue 221. The first interrupt is, for example, an interrupt indicating that the number of NAND commands in the target FIFO area 41 has exceeded the upper limit. The issuance of the interrupt is, for example, generation of an interrupt signal.

The CPU 12 sends feedback based on the first interrupt to the NAND controller front unit 111 ((8) in FIG. 2). This feedback includes, for example, an instruction to start throttling of host commands that are to be acquired from the target submission queue 221. The starting throttling of host commands that are to be acquired from the target submission queue 221 includes, for example, stopping fetching of a host command from the target submission queue 221.

The NAND controller front unit 111 starts throttling of host commands to be acquired from the target submission queue 221 in accordance with the feedback. More specifically, the NAND controller front unit 111 stops, for example, fetching of a host command from the target submission queue 221. While fetching of a host command from the target submission queue 221 is stopped, the NAND controller front unit 111 does not fetch a host command from the target submission queue 221 even when the target submission queue 221 is selected as a submission queue from which a host command is to be fetched according to the arbitration mechanism.

While fetching of a host command from the target submission queue 221 is stopped, the number of NAND commands in the target FIFO area 41 does not increase, and decreases as processing according to a NAND command in the target FIFO area 41 is performed. The processing according to a NAND command is processing of a data-in operation or processing of a program operation according to a write command, processing of a sense operation or processing of a data-out operation according to a read command, or the like.

When the number of NAND commands in the target FIFO area 41 becomes equal to or less than a lower limit while host commands to be acquired from the target submission queue 221 are throttled by issuing the first interrupt, the NAND controller central unit 112 issues a second interrupt and sends the second interrupt to the CPU 12 ((9) in FIG. 2). The second interrupt is, for example, an interrupt indicating that the number of NAND commands in the target FIFO area 41 becomes equal to or less than the lower limit.

The CPU 12 sends feedback based on the second interrupt to the NAND controller front unit 111 ((10) in FIG. 2). This feedback includes, for example, an instruction to end (that is, release) throttling of host commands to be acquired from the target submission queue 221. The ending of throttling of host commands to be acquired from the target submission queue 221 includes, for example, resuming fetching of a host command from the target submission queue 221.

The NAND controller front unit 111 ends throttling of host commands to be acquired from the target submission queue 221 in accordance with the feedback. Specifically, the NAND controller front unit 111 resumes, for example, fetching of a host command from the target submission queue 221. When the fetching of a host command from the target submission queue 221 is resumed, the NAND controller front unit 111 may fetch a host command from the target submission queue 221 while the target submission queue 221 is selected as a submission queue from which a host command is to be fetched according to the arbitration mechanism.

Figure 3:
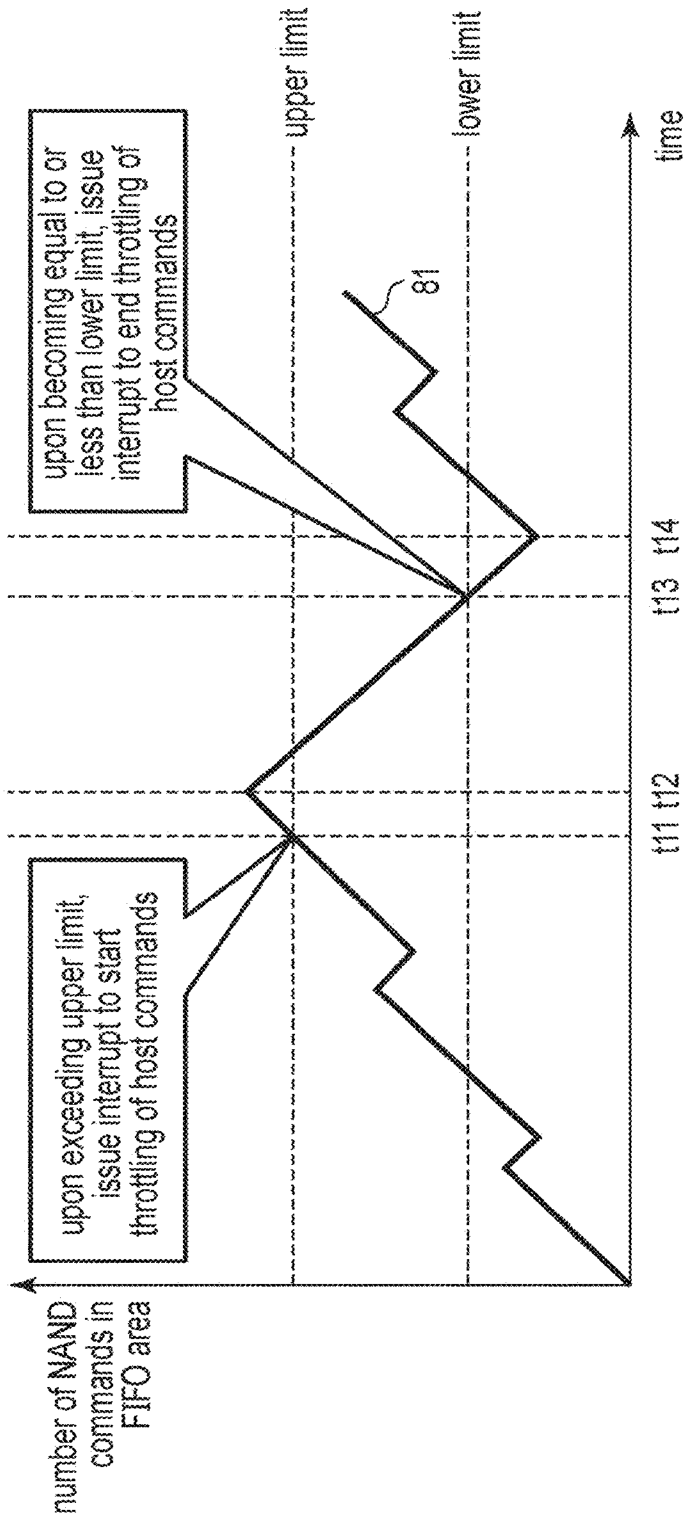
FIG. 3 is a diagram illustrating a first example of a change in the number of NAND commands in a first-in first-out (FIFO) storage area (FIFO area) in the memory system according to the first embodiment.

FIG. 3 is a graph 81 illustrating a first example of a change in the number of NAND commands in the target FIFO area 41. In the graphs in and after FIG. 3 that illustrate the change in the number of NAND commands in the target FIFO area 41, the horizontal axis represents time, and the vertical axis represents the number of NAND commands in the target FIFO area 41.

Storing a NAND command, which corresponds to a host command newly fetched from the target submission queue 221, to the target FIFO area 41 increases the number of NAND commands in the target FIFO area 41. Performing a process according to a NAND command in the target FIFO area 41 decreases the number of NAND commands in the target FIFO area 41.

The graph 81 illustrates a change in the number of NAND commands in the target FIFO area 41 in a case where throttling of host commands to be acquired from the target submission queue 221 is controlled on the basis of the number of NAND commands in the target FIFO area 41.

In a case where the number of NAND commands in the target FIFO area 41 has exceeded the upper limit at time t11 as the number of NAND commands in the target FIFO area 41 increases, the NAND controller central unit 112 issues a first interrupt and sends the first interrupt to the CPU 12. In accordance with the first interrupt, the CPU 12 instructs the NAND controller front unit 111 to start throttling of host commands to be acquired from the target submission queue 221.

The NAND controller front unit 111 stops fetching of a host command from the target submission queue 221 in accordance with the instruction from the CPU 12. While fetching of a host command from the target submission queue 221 is stopped, any NAND command is not newly stored to the target FIFO area 41. Therefore, the number of NAND commands in the target FIFO area 41 decreases every time processing according to a NAND command in the target FIFO area 41 is performed. In the graph 81, the number of NAND commands in the target FIFO area 41 decreases after time t12.

Then, when the number of NAND commands in the target FIFO area 41 becomes equal to or less than the lower limit at time t13, the NAND controller central unit 112 issues a second interrupt and sends the second interrupt to the CPU 12. In accordance with the second interrupt, the CPU 12 instructs the NAND controller front unit 111 to end throttling of host commands to be acquired from the target submission queue 221.

The NAND controller front unit 111 resumes fetching of a host command from the target submission queue 221 in accordance with the instruction from the CPU 12. After fetching of a host command from the target submission queue 221 is resumed, a NAND command is newly stored to the target FIFO area 41. Therefore, the number of NAND commands in the target FIFO area 41 decreases every time processing according to a stored NAND command is performed, and increases every time a NAND command corresponding to a host command, which is fetched from the target submission queue 221, is stored. In the graph 81, the number of NAND commands in the target FIFO area 41 tends to increase after time t14.

As described above, in the controller 4, when the number of NAND commands in the target FIFO area 41 has exceeded the upper limit, fetching of a host command from the target submission queue 221 is stopped. While fetching of a host command from the target submission queue 221 is stopped, a NAND command is not newly stored to the target FIFO area 41. In addition, during this period, a host command stored in another submission queue 221 is preferentially fetched, and a NAND command is stored to the corresponding FIFO area 41. As a result, in the controller 4, it is possible to prevent processing according to a host command acquired from a specific submission queue 221 (here, the target submission queue 221) from being intensively performed. That is, a balance of host commands processed in the controller 4 among the submission queues 221 can be achieved.

However, when throttling of host commands to be acquired from each of the submission queues 221 is frequently controlled, there is a possibility that a processing load on the controller 4 increases.

Therefore, it is conceivable to control throttling of host commands to be acquired from the target submission queue 221 in consideration of not only the number of NAND commands in the target FIFO area 41 but also the number of host commands in the target submission queue 221.

Figure 4:
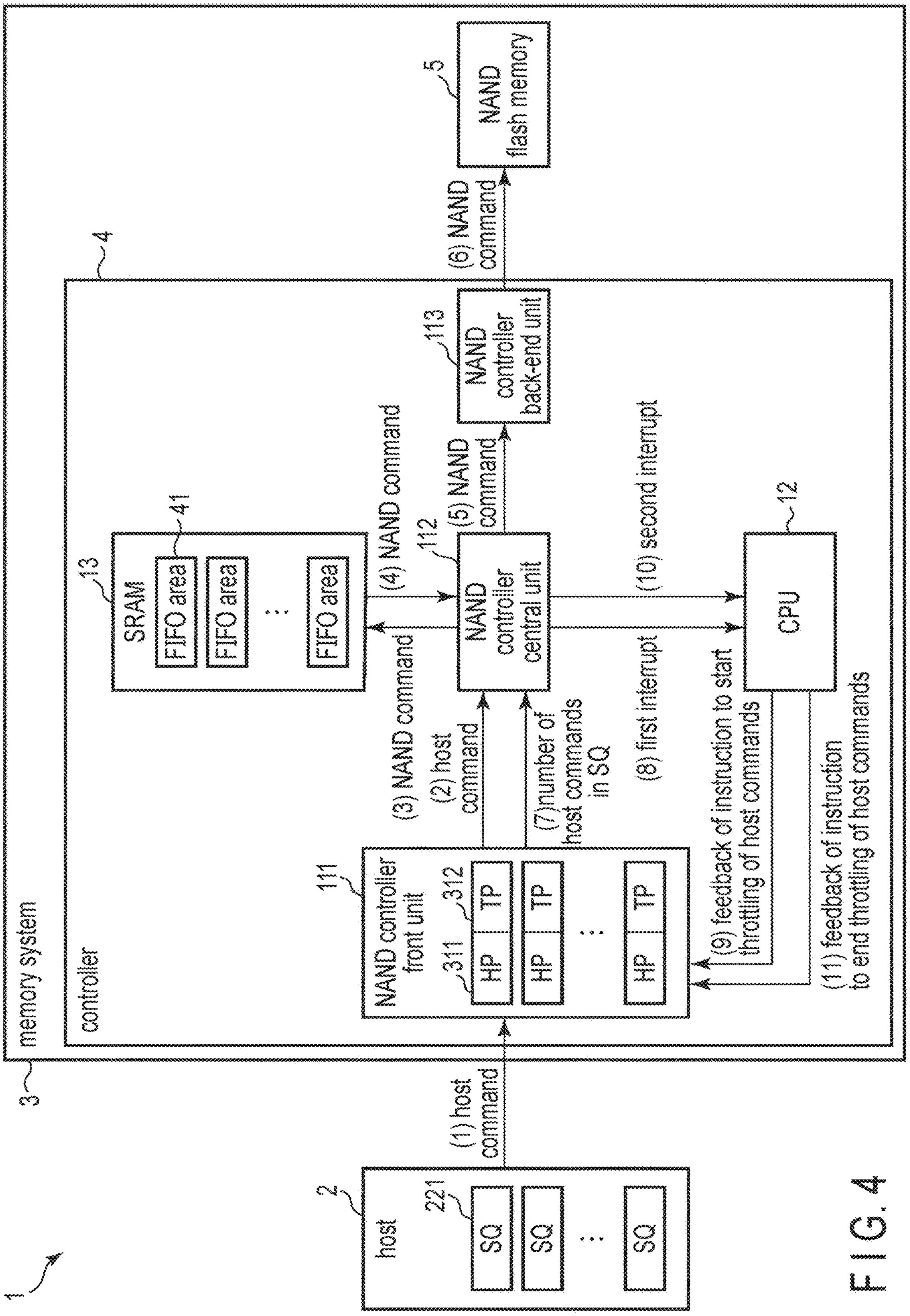
FIG. 4 is a diagram illustrating a second operation example in the memory system according to the first embodiment.

FIG. 4 illustrates an example of an operation in the memory system 3 in a case where the number of NAND commands in the FIFO area 41 and the number of host commands in the submission queue 221 are considered. The operations (1) to (6) in FIG. 4 are similar to the operations (1) to (6) in FIG. 2 described above.

As examples of an operation of controlling throttling of host commands to be acquired from the target submission queue 221 on the basis of the number of NAND commands in the target FIFO area 41 and the number of host commands in the target submission queue 221, two host command throttling control operations will be described below.

(First Host Command Throttling Control Operation)

In a case where the number of host commands in the target submission queue 221 is small when the number of NAND commands in the target FIFO area 41 has exceeded the upper limit, the effect of throttling host commands to be acquired from the target submission queue 221 is low. This is because since the number of host commands in the target submission queue 221 is small, a state in which the number of NAND commands in the target FIFO area 41 exceeds the upper limit does not continue for a long time. Therefore, for example, in a case where the number of host commands in the target submission queue 221 is equal to or less than a first threshold when the number of NAND commands in the target FIFO area 41 has exceeded the upper limit, the controller 4 does not throttle host commands to be acquired from the target submission queue 221.

More specifically, when there is a FIFO area 41 (target FIFO area 41) in which the number of NAND commands has exceeded the upper limit, the NAND controller central unit 112 acquires, from the NAND controller front unit 111, the number of host commands in the submission queue 221 (target submission queue 221) that corresponds to the target FIFO area 41 ((7) in FIG. 4). More specifically, the NAND controller front unit 111 calculates the number of host commands in the target submission queue 221 by using a set of the SQ Head pointer 311 and the SQ Tail pointer 312 that corresponds to the target submission queue 221. Then, the NAND controller front unit 111 notifies the NAND controller central unit 112 of the calculated number of host commands in the target submission queue 221.

When the number of host commands in the target submission queue 221 is equal to or less than the first threshold, the NAND controller central unit 112 does not issue a first interrupt to the CPU 12. As a result, it is possible to reduce the processing load of the CPU 12 that performs processing according to the first interrupt.

Note that the operation in a case where the number of host commands in the target submission queue 221 exceeds the first threshold is similar to the operations (7) to (10) in FIG. 2.

Figure 5:
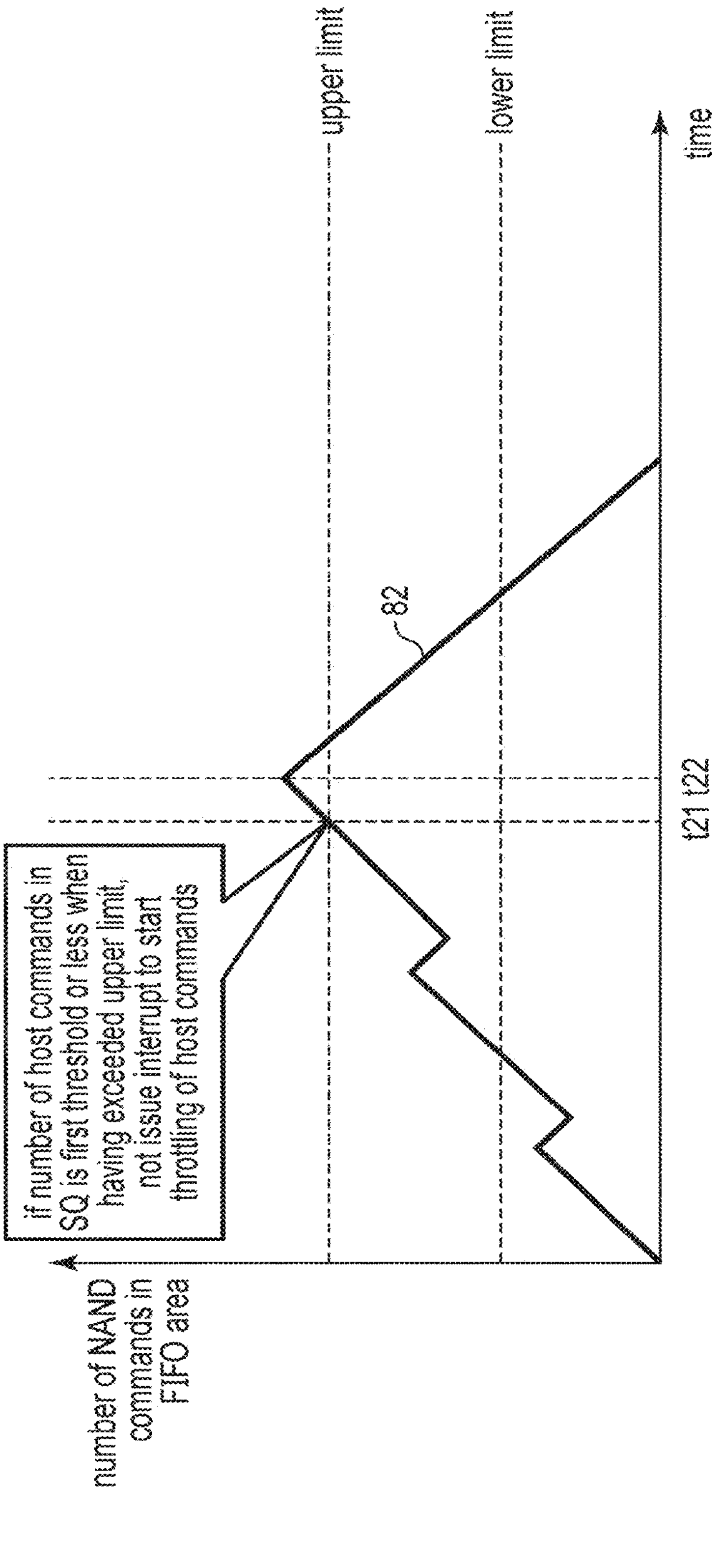
FIG. 5 is a diagram illustrating a second example of a change in the number of NAND commands in a FIFO area in the memory system according to the first embodiment.

FIG. 5 is a graph 82 illustrating an example of a change in the number of NAND commands in the target FIFO area 41 in a case where the first host command throttling control operation is performed.

When the number of NAND commands in the target FIFO area 41 has exceeded the upper limit at time t21 as the number of NAND commands in the target FIFO area 41 increases, the NAND controller central unit 112 acquires the number of host commands in the target submission queue 221 from the NAND controller front unit 111. Then, when the number of host commands in the target submission queue 221 is equal to or less than the first threshold, the NAND controller central unit 112 does not issue a first interrupt to the CPU 12.

Since the number of host commands in the target submission queue 221 is equal to or less than the first threshold, a state in which the number of NAND commands in the target FIFO area 41 exceeds the upper limit does not continue for a long time even if the first interrupt is not issued. That is, the effect of issuing the first interrupt by the NAND controller central unit 112 is low. In the graph 82, the number of NAND commands in the target FIFO area 41 decreases after time t22. Since the first interrupt is not issued, the processing load of the CPU 12 that performs processing according to the interrupt can be reduced.

Figure 6:
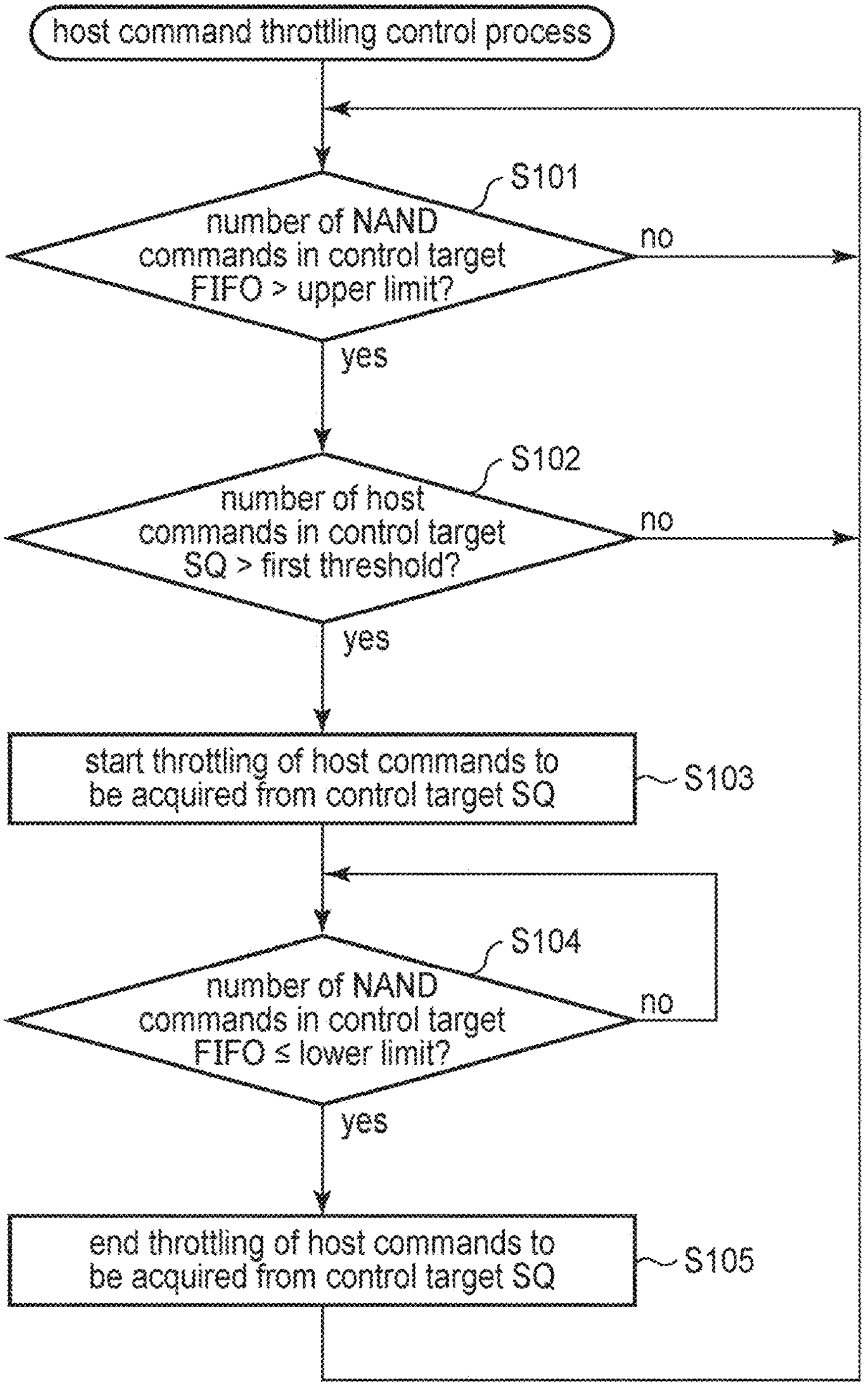
FIG. 6 is a flowchart illustrating a first example of the procedure of a host command throttling control process executed in the memory system according to the first embodiment.

FIG. 6 is a flowchart illustrating a first example of the procedure of a host command throttling control process executed by the controller 4. The host command throttling control process illustrated in FIG. 6 is a process for realizing the first host command throttling control operation.

The host command throttling control process is a process for controlling throttling of host commands to be acquired from one submission queue 221. For example, in response to creation of the submission queue 221 and setting of the corresponding FIFO area 41, the controller 4 starts the host command throttling control process corresponding to the submission queue 221. In a case where the host 2 includes the multiple submission queues 221, the controller 4 executes multiple host command throttling control processes that correspond to the submission queues 221, respectively, in parallel. Hereinafter, a submission queue 221 that is a target of the host command throttling control process is referred to as a control target submission queue 221. Furthermore, the FIFO area 41 corresponding to the control target submission queue 221 is referred to as a control target FIFO area 41.

First, the controller 4 determines whether the number of NAND commands in the control target FIFO area 41 has exceeded the upper limit (step S101). When the number of NAND commands in the target FIFO area 41 is equal to or less than the upper limit (no in step S101), the processing by the controller 4 returns to step S101.

When the number of NAND commands in the control target FIFO area 41 has exceeded the upper limit (yes in step S101), the controller 4 determines whether the number of host commands in the control target submission queue 221 exceeds the first threshold (step S102). Note that the controller 4 can acquire the number of host commands in the control target submission queue 221 by using the SQ head pointer 131 and the SQ tail pointer 132 that correspond to the control target submission queue 221. When the number of host commands in the control target submission queue 221 is equal to or less than the first threshold (no in step S102), the processing by the controller 4 returns to step S101.

When the number of host commands in the control target submission queue 221 exceeds the first threshold (yes in step S102), the controller 4 starts throttling of host commands to be acquired from the control target submission queue 221 (step S103). More specifically, the NAND controller central unit 112 issues a first interrupt and sends the first interrupt to the CPU 12. In accordance with the first interrupt, the CPU 12 instructs the NAND controller front unit 111 to start throttling of host commands to be acquired from the control target submission queue 221. The NAND controller front unit 111 starts throttling of host commands to be acquired from the control target submission queue 221 in accordance with the instruction from the CPU 12.

Next, the controller 4 determines whether the number of NAND commands in the control target FIFO area 41 becomes equal to or less than the lower limit (step S104). When the number of NAND commands in the control target FIFO area 41 exceeds the lower limit (no in step S104), the processing by the controller 4 returns to step S104.

When the number of NAND commands in the control target FIFO area 41 becomes equal to or less than the lower limit (yes in step S104), the controller 4 ends throttling of host commands to be acquired from the control target submission queue 221 (step S105), and the processing by the controller 4 returns to step S101. More specifically, the NAND controller central unit 112 issues a second interrupt and sends the second interrupt to the CPU 12. In accordance with the second interrupt, the CPU 12 instructs the NAND controller front unit 111 to end throttling of host commands to be acquired from the control target submission queue 221. The NAND controller front unit 111 ends throttling of host commands to be acquired from the control target submission queue 221 in accordance with the instruction from the CPU 12.

According to the host command throttling control process described above, the controller 4 controls start and end of throttling of host commands to be acquired from the control target submission queue 221 on the basis of the number of NAND commands in the control target FIFO area 41 and the number of host commands in the control target submission queue 221.

Specifically, in a case where the number of host commands in the control target submission queue 221 exceeds the first threshold when the number of NAND commands in the control target FIFO area 41 has exceeded the upper limit, the controller 4 starts throttling of host commands to be acquired from the control target submission queue 221. When the number of NAND commands in the target FIFO area 41 becomes equal to or less than the lower limit while throttling host commands to be acquired from the control target submission queue 221, the controller 4 ends throttling of host commands to be acquired from the control target submission queue 221.

With such control, it is possible to prevent host commands acquired from the control target submission queue 221 from being intensively processed as compared with host commands acquired from the other submission queues 221. That is, it is possible to strike a balance in which host commands are processed, among the submission queues 221.

In addition, in a case where the number of host commands in the control target submission queue 221 is equal to or less than the first threshold even when the number of NAND commands in the control target FIFO area 41 has exceeded the upper limit, the controller 4 does not start throttling of host commands to be acquired from the control target submission queue 221. This is because since the number of host commands in the control target submission queue 221 is equal to or less than the first threshold, it is predicted that the state in which the number of NAND commands in the control target FIFO area 41 exceeds the upper limit will not continue for a long time. When the number of host commands in the control target submission queue 221 is equal to or less than the first threshold, throttling of host commands to be acquired from the control target submission queue 221 is not started, thereby, in the controller 4, reducing the processing load for controlling throttling of host commands to be acquired from the control target submission queue 221.

In addition, by performing the above-described operation on each of the combinations of the submission queue 221 and the FIFO area 41, in the memory system 3, it is possible to efficiently control acquisition of host commands from each of the submission queues 221 while maintaining a balance in which host commands are processed, among the submission queues 221.

(Second Host Command Throttling Control Operation

The description will continue by returning to FIG. 4.

In a case where the number of host commands in the target submission queue 221 is large when the number of NAND commands in the target FIFO area 41 has exceeded the upper limit, there is a possibility that start and end of throttling of host commands to be acquired from the target submission queue 221 are repeatedly performed in a short time. More specifically, the number of NAND commands in the target FIFO area 41 becomes equal to or less than the lower limit by throttling host commands to be acquired from the target submission queue 221. In response to this, if the throttling of host commands to be acquired from the target submission queue 221 is ended while the number of host commands in the target submission queue 221 is large, the number of NAND commands in the target FIFO area 41 will exceed the upper limit again in a short time. In such a case, issuance of a first interrupt and issuance of a second interrupt by the NAND controller central unit 112 frequently occur. Therefore, the processing load of the CPU 12 that performs processing according to the interrupts increases.

Therefore, in a case where the number of host commands in the target submission queue 221 is equal to or greater than a second threshold when the number of NAND commands in the target FIFO area 41 has exceeded the upper limit, the controller 4 performs control so that the interval between start and end of throttling of host commands to be acquired from the target submission queue 221 (that is, the interval between issuance of a first interrupt and issuance of a second interrupt) lengthens.

More specifically, when there is a FIFO area 41 (target FIFO area 41) in which the number of NAND commands has exceeded the upper limit, the NAND controller central unit 112 acquires the number of host commands in the submission queue 221 (target submission queue 221), which corresponds to the target FIFO area 41, from the NAND controller front unit 111 ((7) in FIG. 4). The NAND controller central unit 112 decreases the lower limit when the number of host commands in the target submission queue 221 is equal to or greater than the second threshold. Then, the NAND controller central unit 112 issues a first interrupt and sends the first interrupt to the CPU 12 ((8) in FIG. 4).

The CPU 12 sends feedback that includes an instruction to start throttling of host commands to be acquired from the target submission queue 221, to the NAND controller front unit 111 in accordance with the first interrupt ((9) in FIG. 4). Then, the NAND controller front unit 111 starts throttling of host commands to be acquired from the target submission queue 221 in accordance with the feedback. More specifically, the NAND controller front unit 111 stops fetching of a host command from the target submission queue 221, for example.

When the number of NAND commands in the target FIFO area 41 becomes equal to or less than the decreased lower limit after issuing the first interrupt, the NAND controller central unit 112 issues a second interrupt and sends the second interrupt to the CPU 12 ((10) in FIG. 4).

In accordance with the second interrupt, the CPU 12 sends feedback that includes an instruction to end throttling of host commands to be acquired from the target submission queue 221, to the NAND controller front unit 111 ((11) in FIG. 4). The NAND controller front unit 111 ends throttling of host commands to be acquired from the target submission queue 221 on the basis of the feedback. More specifically, the NAND controller front unit 111 resumes fetching of a host command from the target submission queue 221, for example.

In this manner, the NAND controller central unit 112 does not issue a second interrupt until the number of NAND commands in the target FIFO area 41 becomes equal to or less than the decreased lower limit. As a result, it is possible to lengthen the interval between start and end of throttling of host commands to be acquired from the target submission queue 221. Therefore, it is possible to reduce the processing load of the CPU 12 that performs the processing according to the interrupts.

Therefore, throttling of host commands to be acquired from the target submission queue 221 can be efficiently controlled by further considering the number of host commands in the target submission queue 221 in addition to the number of NAND commands in the target FIFO area 41.

Note that the operation in a case where the number of host commands in the target submission queue 221 is less than the second threshold is similar to the operations (7) to (10) in FIG. 2.

Figure 7:
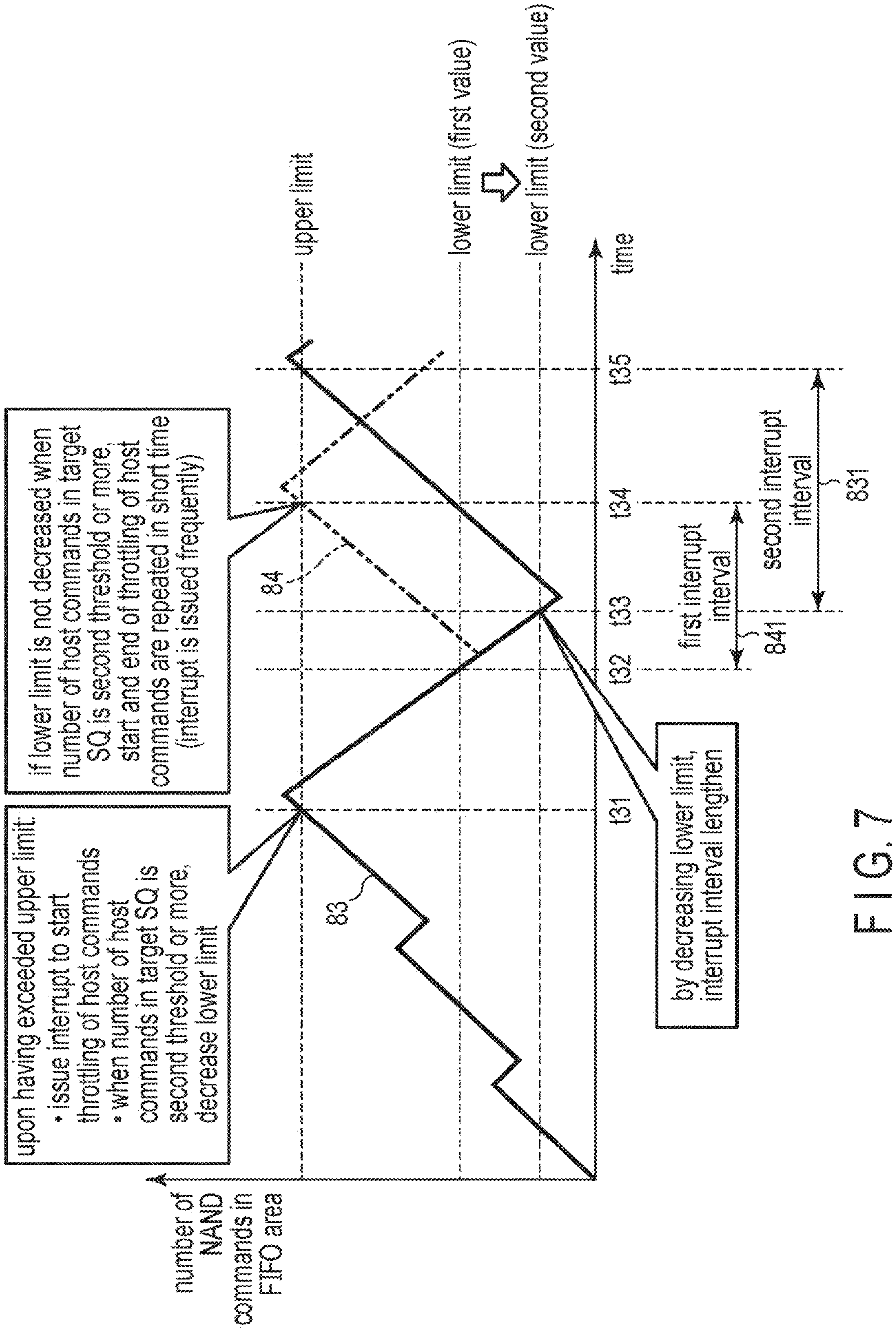
FIG. 7 is a diagram illustrating a third example of a change in the number of NAND commands in a FIFO area in the memory system according to the first embodiment.

FIG. 7 is a graph 83 illustrating an example of a change in the number of NAND commands in the target FIFO area 41 in a case where the second host command throttling control operation is performed.

When the number of NAND commands in the target FIFO area 41 has exceeded the upper limit at time t31 as the number of NAND commands in the target FIFO area 41 increases, the NAND controller central unit 112 issues a first interrupt and sends the first interrupt to the CPU 12.

In addition, when the number of NAND commands in the target FIFO area 41 has exceeded the upper limit at time t31, the NAND controller central unit 112 acquires the number of host commands in the target submission queue 221 from the NAND controller front unit 111. Then, the NAND controller central unit 112 determines whether the number of host commands in the target submission queue 221 is equal to or greater than the second threshold. A case where the number of host commands in the target submission queue 221 is equal to or greater than the second threshold and a case where the number of host commands in the target submission queue 221 is less than the second threshold will be described below, respectively.

(When the Number of Host Commands in the Target Submission Queue 221 is Equal to or Greater Than the Second Threshold)

When the number of host commands in the target submission queue 221 is equal to or greater than the second threshold, the NAND controller central unit 112 decreases the lower limit. For example, the NAND controller central unit 112 changes the lower limit from a first value to a second value. The second value is smaller than the first value.

At time t32, since the lower limit has been changed from the first value to the second value, the NAND controller central unit 112 does not issue a second interrupt even when the number of NAND commands in the target FIFO area 41 becomes equal to or less than the first value.

At time t33, when the number of NAND commands in the target FIFO area 41 becomes equal to or less than the lower limit (=the second value), the NAND controller central unit 112 issues the second interrupt and sends the second interrupt to the CPU 12. In accordance with the second interrupt, the CPU 12 instructs the NAND controller front unit 111 to end throttling of host commands to be acquired from the target submission queue 221. In addition, the NAND controller central unit 112 returns the lower limit to the original value that is the value before the lower limit is decreased. For example, the NAND controller central unit 112 changes the lower limit from the second value to the first value.

The NAND controller front unit 111 resumes fetching of a host command from the target submission queue 221 in accordance with the instruction from the CPU 12. After fetching of a host command from the target submission queue 221 is resumed, a NAND command is newly stored to the target FIFO area 41. Therefore, the number of NAND commands in the target FIFO area 41 decreases every time processing according to the NAND command stored in the target FIFO area 41 is performed, and increases every time a NAND command corresponding to a host command, which is fetched from the target submission queue 221, is stored.

Then, when the number of NAND commands in the target FIFO area 41 has exceeded the upper limit at time t35, the NAND controller central unit 112 issues the first interrupt again and sends the first interrupt to the CPU 12. The NAND controller front unit 111 stops fetching of a host command from the target submission queue 221 in accordance with the instruction from the CPU 12. While fetching of a host command from the target submission queue 221 is stopped, a NAND command is not newly stored to the target FIFO area 41. Therefore, the number of NAND commands in the target FIFO area 41 decreases every time processing according to the NAND command is performed.

Here, it is assumed another case where the lower limit is not decreased even when the number of host commands in the target submission queue 221 is equal to or greater than the second threshold at time t31. A graph 84 illustrates an example of a change in the number of NAND commands in the target FIFO area 41 in a case where the lower limit is not decreased even when the number of host commands in the target submission queue 221 is equal to or greater than the second threshold. For example, the first value is set as the lower limit.

In this case, when the number of NAND commands in the target FIFO area 41 becomes equal to or less than the lower limit (=the first value) at time t32, the NAND controller central unit 112 issues the second interrupt and sends the second interrupt to the CPU 12. In accordance with the second interrupt, the CPU 12 instructs the NAND controller front unit 111 to end throttling of host commands to be acquired from the target submission queue 221. The NAND controller front unit 111 resumes fetching of a host command from the target submission queue 221 in accordance with the instruction from the CPU 12. After fetching of a host command from the target submission queue 221 is resumed, a NAND command is newly stored to the target FIFO area 41. Therefore, the number of NAND commands in the target FIFO area 41 decreases every time processing according to the NAND command stored in the target FIFO area 41 is performed, and increases every time a NAND command corresponding to a host command, which is fetched from the target submission queue 221, is stored.

Then, when the number of NAND commands in the target FIFO area 41 has exceeded the upper limit at time t34, the NAND controller central unit 112 issues the first interrupt again and sends the first interrupt to the CPU 12. In accordance with the first interrupt, the CPU 12 instructs the NAND controller front unit 111 to start throttling of host commands to be acquired from the target submission queue 221. The NAND controller front unit 111 stops fetching of a host command from the target submission queue 221 in accordance with the instruction from the CPU 12. While fetching of a host command from the target submission queue 221 is stopped, a NAND command is not newly stored to the target FIFO area 41. Therefore, the number of NAND commands in the target FIFO area 41 decreases every time processing according to the NAND command is performed.

Here, a time interval between the first interrupt and the second interrupt which are continuously issued is defined as an interrupt interval. In the example illustrated in FIG. 7, an interval from time t32 (when the second interrupt is issued) to time t34 (when the first interrupt is issued next in a case where the first value is set as the lower limit) is denoted as a first interrupt interval 841. In addition, an interval from time t33 (when the second interrupt is issued) to time t35 (when the first interrupt is issued next in a case where the second value is set as the lower limit) is denoted as a second interrupt interval 831.

The second interrupt interval 831 is longer than the first interrupt interval 841. That is, by decreasing the lower limit from the first value to the second value, the interrupt interval can be lengthened.

If the lower limit is not decreased when the number of host commands in the submission queue 221 is equal to or greater than the second threshold, the NAND controller central unit 112 frequently issues interrupts at the short first interrupt intervals 841. That is, start and end of throttling of host commands to be acquired from the target submission queue 221 are repeatedly performed in a short time. As the interrupts are frequently issued, the processing load by the CPU 12 in accordance with the interrupts increases.

Therefore, in a case where the number of host commands in the submission queue 221 is equal to or greater than the second threshold when the number of NAND commands in the FIFO area 41 has exceeded the upper limit, the NAND controller central unit 112 decreases the lower limit. As a result, since the interrupt interval can be lengthened, it is possible to prevent start and end of throttling of host commands to be acquired from the target submission queue 221 from being repeatedly performed in a short time. In addition, the processing load by the CPU 12 according to the interrupts can be reduced.

(When the Number of Host Commands in the Target Submission Queue 221 is Less Than the Second Threshold)

When the number of host commands in the target submission queue 221 is less than the second threshold, the NAND controller central unit 112 does not change the lower limit. For example, the NAND controller central unit 112 keeps the first value set as the lower limit. This is because when the number of host commands in the target submission queue 221 is less than the second threshold, it is estimated that interrupts are not issued frequently even if the lower limit is not decreased.

The change in the number of NAND commands in the FIFO area 41 when the number of host commands in the target submission queue 221 is less than the second threshold is similar to the change in the number of NAND commands in the FIFO area 41 described above with reference to FIG. 3.

Figure 8:
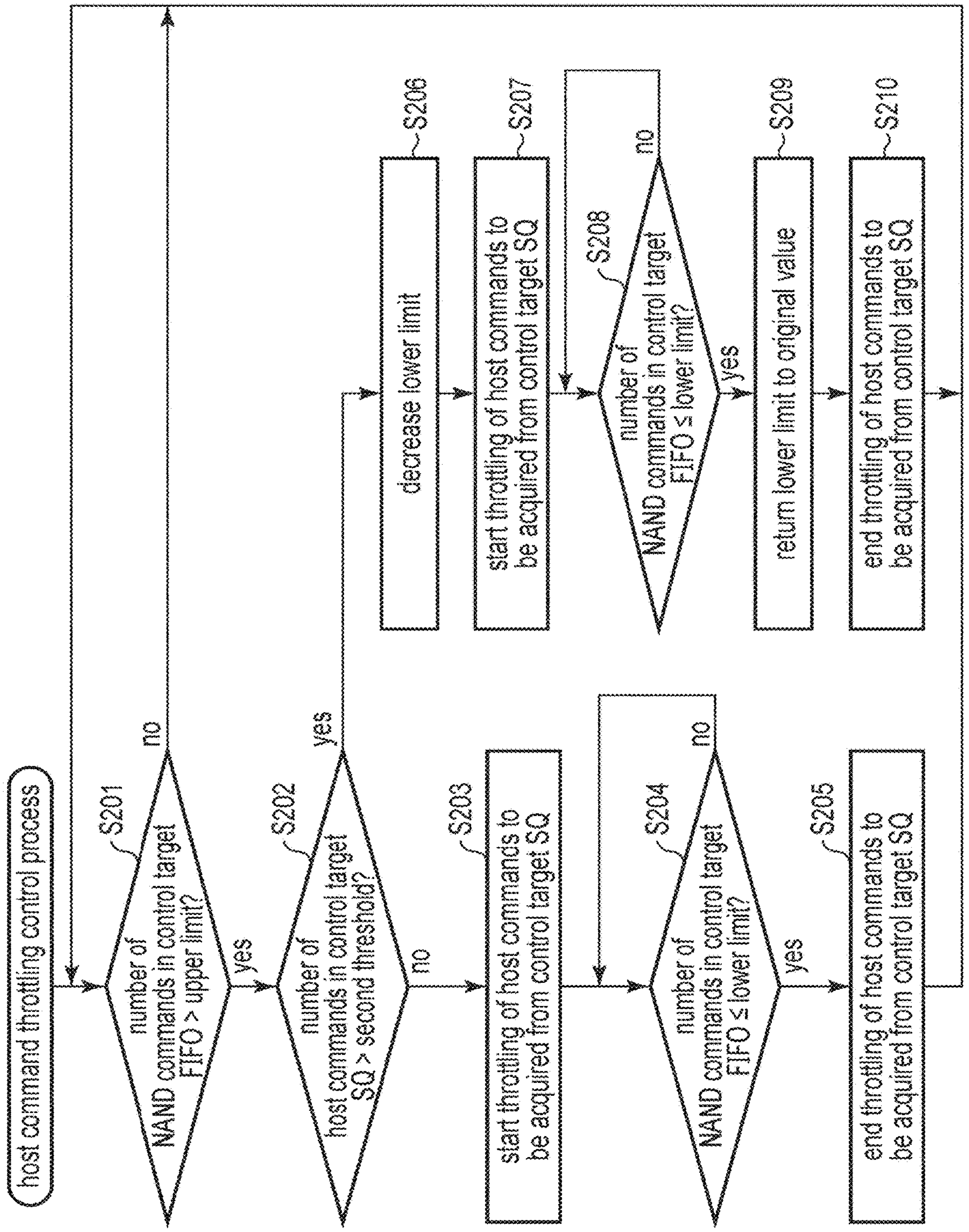
FIG. 8 is a flowchart illustrating a second example of the procedure of a host command throttling control process executed in the memory system according to the first embodiment.

FIG. 8 is a flowchart illustrating a second example of the procedure of the host command throttling control process executed by the controller 4. The host command throttling control process illustrated in FIG. 8 is a process for realizing the second host command throttling control operation.

First, the controller 4 determines whether the number of NAND commands in the control target FIFO area 41 has exceeded the upper limit (step S201). When the number of NAND commands in the control target FIFO area 41 is equal to or less than the upper limit (no in step S201), the processing by the controller 4 returns to step S201.

When the number of NAND commands in the control target FIFO area 41 has exceeded the upper limit (yes in step S201), the controller 4 determines whether the number of host commands in the control target submission queue 221 exceeds the second threshold (step S202).

When the number of host commands in the control target submission queue 221 is equal to or less than the second threshold (no in step S202), the controller 4 starts throttling of host commands to be acquired from the control target submission queue 221 (step S203).

Next, the controller 4 determines whether the number of NAND commands in the control target FIFO area 41 becomes equal to or less than the lower limit (step S204). When the number of NAND commands in the control target FIFO area 41 exceeds the lower limit (no in step S204), the processing by the controller 4 returns to step S204.

When the number of NAND commands in the control target FIFO area 41 becomes equal to or less than the lower limit (yes in step S204), the controller 4 ends throttling of host commands to be acquired from the control target submission queue 221 (step S205), and the processing by the controller 4 returns to step S201.

On the other hand, when the number of host commands in the control target submission queue 221 exceeds the second threshold (yes in step S202), the controller 4 decreases the lower limit (step S206). Then, the controller 4 starts throttling of host commands to be acquired from the control target submission queue 221 (step S207).

Next, the controller 4 determines whether the number of NAND commands in the control target FIFO area 41 becomes equal to or less than the lower limit (step S208). When the number of NAND commands in the control target FIFO area 41 exceeds the lower limit (no in step S208), the processing by the controller 4 returns to step S208.

When the number of NAND commands in the control target FIFO area 41 becomes equal to or less than the lower limit (yes in step S208), the controller 4 returns the lower limit to the original value (step S209). The original value is the value before the lower limit is decreased in step S206. Then, the controller 4 ends throttling of host commands to be acquired from the control target submission queue 221 (step S210), and the processing by the controller 4 returns to step S201.

According to the host command throttling control process described above, the controller 4 controls start and end of throttling of host commands to be acquired from the control target submission queue 221 on the basis of the number of NAND commands in the control target FIFO area 41 and the number of host commands in the control target submission queue 221.

Specifically, in a case where the number of host commands in the control target submission queue 221 exceeds the second threshold when the number of NAND commands in the control target FIFO area 41 has exceeded the upper limit, the controller 4 decreases the lower limit and starts throttling of host commands to be acquired from the control target submission queue 221. When the number of NAND commands in the control target FIFO area 41 becomes equal to or less than the lower limit while throttling host commands to be acquired from the control target submission queue 221, the controller 4 returns the lower limit to the original value and ends throttling of host commands to be acquired from the control target submission queue 221.

By decreasing the lower limit, the time from start to end of throttling of host commands to be acquired from the control target submission queue 221 lengthens. As a result, it is possible to prevent start and end of throttling of host commands to be acquired from the control target submission queue 221 from being repeatedly performed in a short time. More specifically, it is possible to reduce the frequency of issuing an interrupt for controlling start and end of throttling of host commands to be acquired from the control target submission queue 221. Therefore, in the controller 4, the processing load for controlling throttling of host commands to be acquired from the control target submission queue 221 can be reduced. This processing load includes, for example, a processing load of the CPU 12 that performs processing according to an interrupt.

In addition, by performing the above-described operation on each of the combinations of the submission queue 221 and the FIFO area 41, in the memory system 3, it is possible to efficiently control acquisition of host commands from each of the submission queues 221 while maintaining a balance in which the host commands are processed, among the submission queues 221.

The controller 4 may execute a process in which the host command throttling control processes illustrated in FIGS. 6 and 8 are integrated. For example, the controller 4 executes a host command throttling control process including: (1) not starting throttling of host commands to be acquired from the control target submission queue 221 in a case where the number of host commands in the control target submission queue 221 is equal to or less than the first threshold even when the number of NAND commands in the control target FIFO area 41 has exceeded the upper limit; and (2) decreasing the lower limit in a case where the number of host commands in the control target submission queue 221 exceeds the second threshold when the number of NAND commands in the control target FIFO area 41 has exceeded the upper limit. In this case, for example, the controller 4 executes the host command throttling control process illustrated in FIG. 6 in which the procedure from step S103 to step S105 is replaced with the procedure from step S202 to step S210 illustrated in FIG. 8. As a result, effects of both the first and the second host command throttling control operations can be obtained.

Second Embodiment

In the first embodiment, throttling of host commands to be acquired from the submission queue 221 is controlled on the basis of the number of NAND commands in the FIFO area 41 and the number of host commands in the submission queue 221. On the contrary, in a second embodiment, throttling of host commands to be acquired from the submission queue 221 is controlled on the basis of the number of NAND commands in the FIFO area 41 and time from when the number of NAND commands in the FIFO area 41 has exceeded a lower limit to when the number of NAND commands exceeds an upper limit.

The configuration of a memory system 3 according to the second embodiment is substantially similar to that of the memory system 3 according to the first embodiment. The second embodiment is different from the first embodiment only in terms of a configuration for measuring the time from when the number of NAND commands in the FIFO area 41 has exceeded the lower limit to when the number of NAND commands exceeds the upper limit, and controlling throttling of host commands to be acquired from the submission queue 221 by using the measured time. Hereinafter, the difference from the first embodiment will be mainly described.

Figure 9:
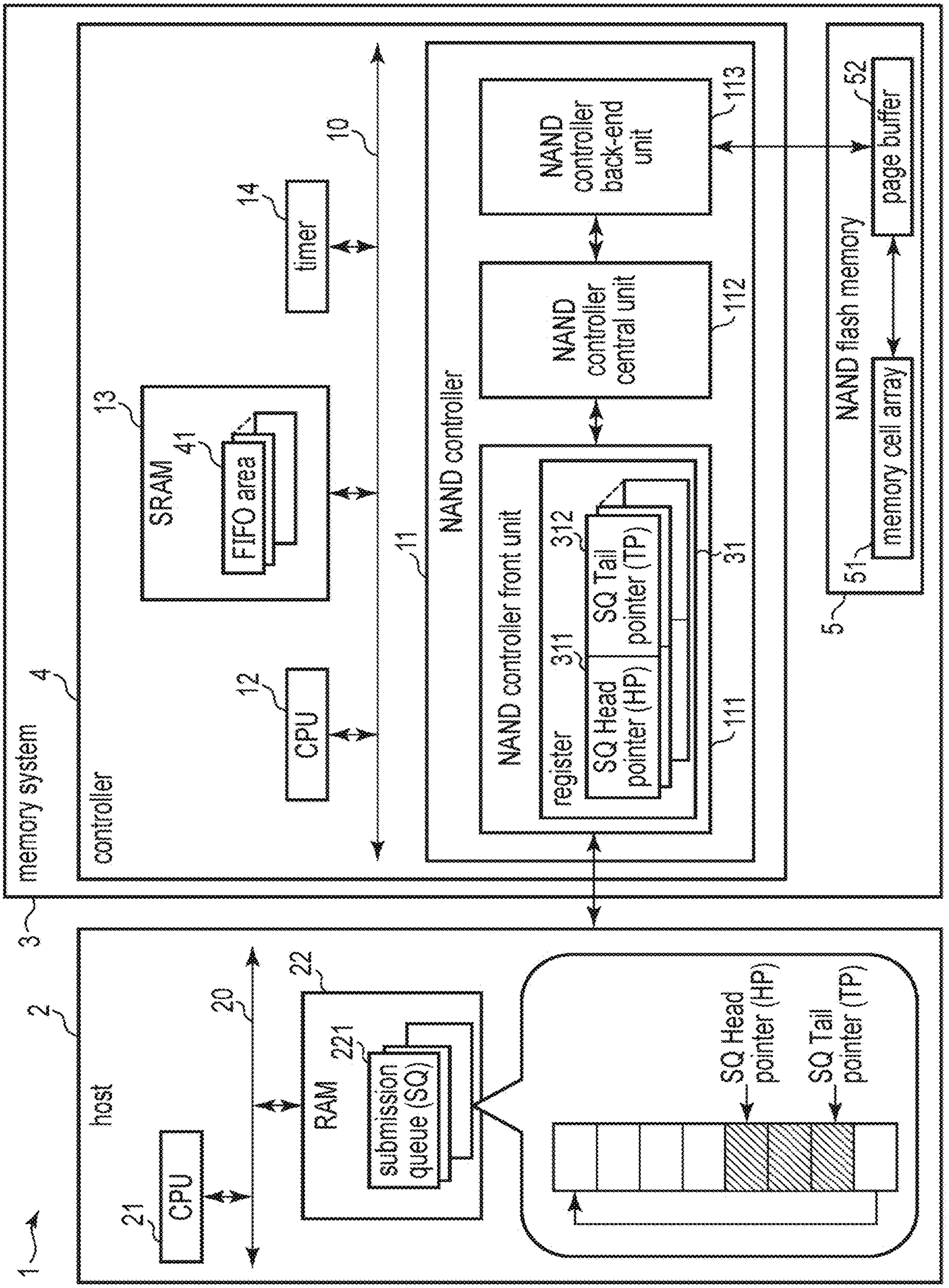
FIG. 9 is a block diagram illustrating an example of a configuration of an information processing system that includes a memory system according to a second embodiment.

FIG. 9 illustrates an example of a configuration of the information processing system 1 that includes the memory system 3 according to the second embodiment. The memory system 3 according to the second embodiment includes a timer 14 in addition to the configuration of the memory system 3 according to the first embodiment illustrated in FIG. 1.

The timer 14 measures time. The timer 14 may provide the measured time to each unit of the controller 4.

Figure 10:
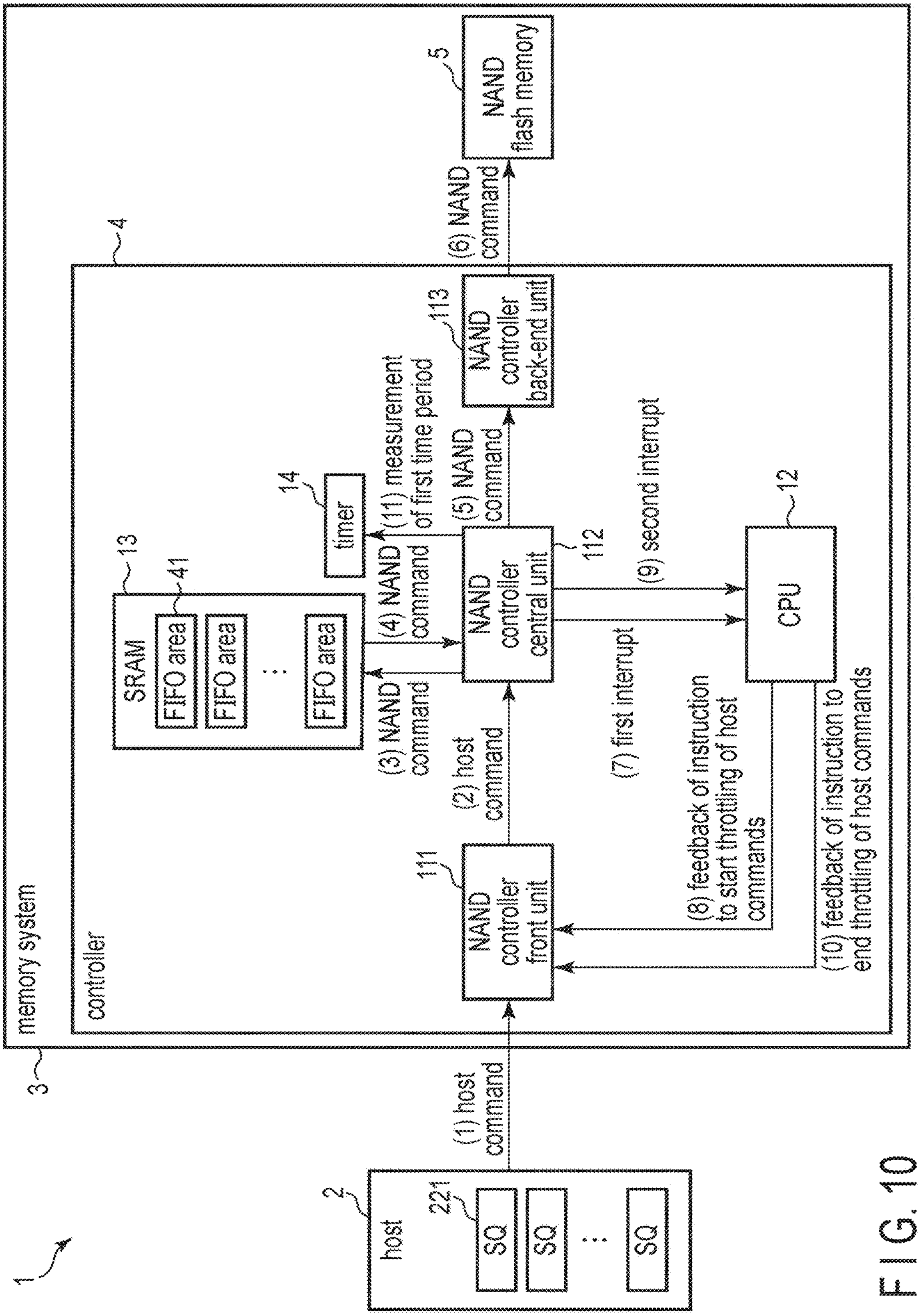
FIG. 10 is a diagram illustrating an operation example in the memory system according to the second embodiment.

FIG. 10 illustrates an example of an operation in the memory system 3. The operations (1) to (6) in FIG. 10 are similar to the operations (1) to (6) in FIG. 2 described above. Hereinafter, an operation example of controlling throttling of host commands to be acquired from the target submission queue 221 using the number of NAND commands in a target FIFO area 41 and the time from when the number of NAND commands in the target FIFO area 41 has exceeded the lower limit to when the number of NAND commands exceeds the upper limit will be described.

When there is a FIFO area 41 in which the number of NAND commands has exceeded the upper limit, the controller 4 performs control to throttle host commands to be acquired from the corresponding submission queue 221.

More specifically, the NAND controller central unit 112 monitors the number of NAND commands stored in each of the FIFO areas 41. When there is a FIFO area 41 (target FIFO area 41) in which the number of NAND commands has exceeded the upper limit, the NAND controller central unit 112 issues a first interrupt and sends the first interrupt to the CPU 12 ((7) in FIG. 10).

The CPU 12 sends feedback based on the first interrupt to the NAND controller front unit 111 ((8) in FIG. 10). This feedback includes, for example, an instruction to start throttling of host commands to be acquired from the submission queue 221 (target submission queue 221) that corresponds to the target FIFO area 41.

The NAND controller front unit 111 starts throttling of host commands to be acquired from the target submission queue 221 in accordance with the feedback. Specifically, the NAND controller front unit 111 stops, for example, fetching of a host command from the target submission queue 221. While fetching of a host command from the target submission queue 221 is stopped, the number of NAND commands in the target FIFO area 41 does not increase, and decreases as processing corresponding to the NAND command in the target FIFO area 41 is performed.

When the number of NAND commands in the target FIFO area 41 becomes equal to or less than the lower limit after issuing the first interrupt, the NAND controller central unit 112 issues a second interrupt and sends the second interrupt to the CPU 12 ((9) in FIG. 10).

The CPU 12 sends feedback based on the second interrupt to the NAND controller front unit 111 ((10) in FIG. 10). This feedback includes, for example, an instruction to end throttling of host commands to be acquired from the target submission queue 221.

The NAND controller front unit 111 ends throttling of host commands to be acquired from the target submission queue 221 in accordance with the feedback. Specifically, the NAND controller front unit 111 resumes fetching of a host command from the target submission queue 221, for example.

When the number of NAND commands in the target FIFO area 41 has exceeded the lower limit after issuing the second interrupt, the NAND controller central unit 112 starts measurement of time from when the number of NAND commands in the target FIFO area 41 has exceeded the lower limit to when the number of NAND commands exceeds the upper limit, with use of the timer 14 ((11) in FIG. 10). Hereinafter, the time from when the number of NAND commands in the target FIFO area 41 has exceeded the lower limit to when the number of NAND commands exceeds the upper limit is also referred to as a first time period.

Then, when the number of NAND commands in the target FIFO area 41 has exceeded the upper limit, the NAND controller central unit 112 ends the measurement of the first time period. The NAND controller central unit 112 adjusts the lower limit on the basis of the measured first time period. Specifically, the NAND controller central unit 112 adjusts the lower limit so that the lower limit increases when the measured first time period is long. More specifically, when the first time period is equal to or greater than a third threshold, the NAND controller central unit 112 sets a first value as the lower limit. When the first time period is less than the third threshold, the NAND controller central unit 112 sets a second value as the lower limit. The first value is larger than the second value.

Thereafter, the operations of (7) to (11) in FIG. 10 described above are further performed using the lower limit to which either the first value or the second value is set.

In a case where the second value is set as the lower limit, the time from start to end of throttling of host commands to be acquired from the target submission queue 221 is longer than time in a case where the first value is set as the lower limit. Therefore, it is possible to prevent start and end of throttling of host commands to be acquired from the target submission queue 221 from being repeatedly performed in a short time when the measured first time period is short. More specifically, it is possible to reduce the frequency of issuing an interrupt for controlling start and end of throttling of host commands to be acquired from the target submission queue 221. Therefore, in the controller 4, a processing load for controlling acquisition of host commands from the target submission queue 221 (for example, a processing load by the CPU 12 that performs processing according to an interrupt) can be reduced. In addition, by performing the above-described operation on each of the combinations of the submission queue 221 and the FIFO area 41, in the memory system 3, it is possible to efficiently control acquisition of host commands from each of the submission queues 221 while maintaining a balance in which the host commands are processed, among the submission queues 221.

Figure 11:
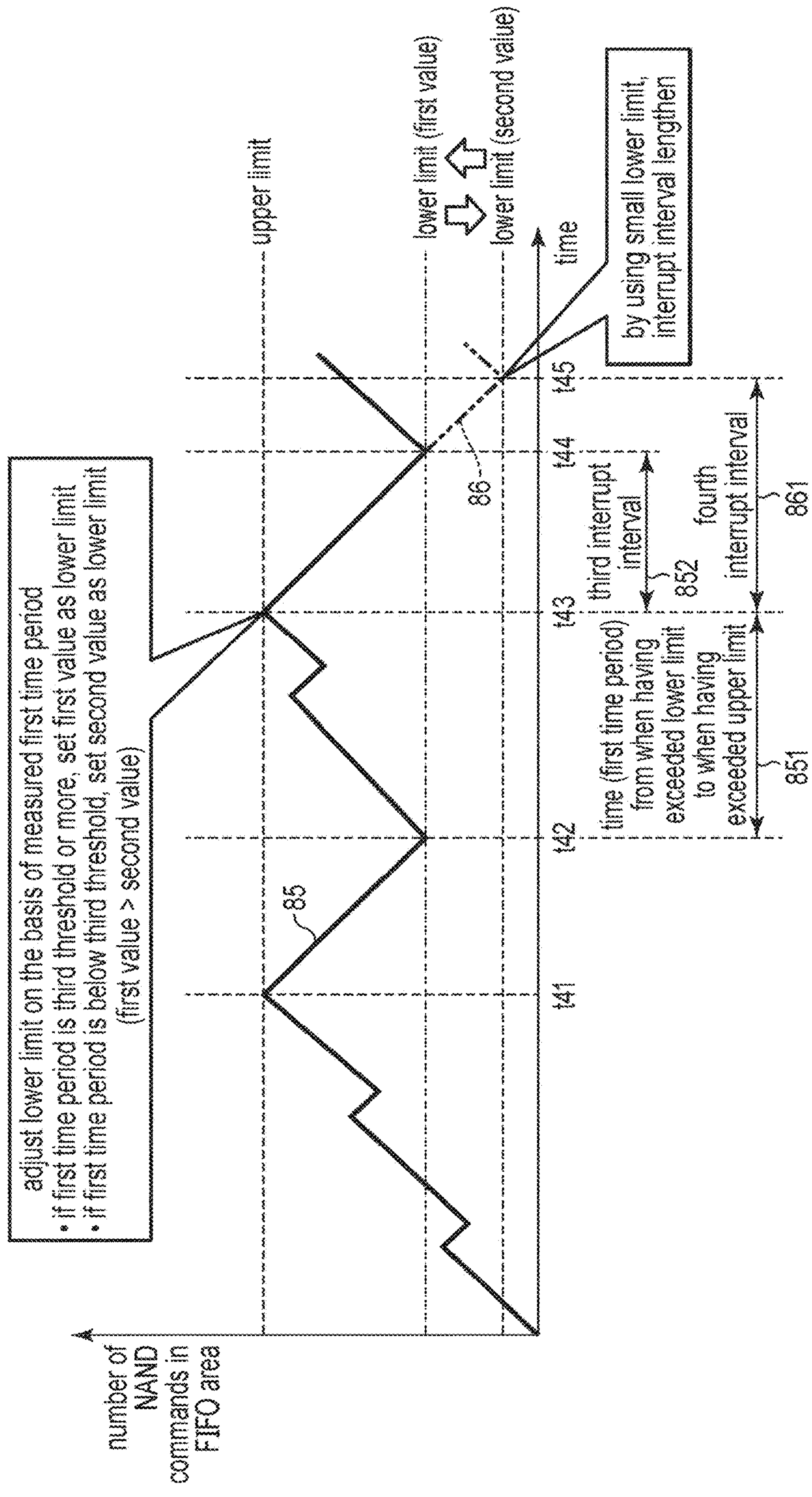
FIG. 11 is a diagram illustrating an example of a change in the number of NAND commands in a FIFO area in the memory system according to the second embodiment.

FIG. 11 is graphs 85 and 86 illustrating an example of a change in the number of NAND commands in the target FIFO area 41. The graphs 85 and 86 illustrate a change in the number of NAND commands in the target FIFO area 41 in a case where throttling of host commands to be acquired from the target submission queue 221 is controlled using the number of NAND commands in the target FIFO area 41 and the time (first time period) from when the number of NAND commands in the target FIFO area 41 has exceeded the lower limit to when the number of NAND commands exceeds the upper limit.

When the number of NAND commands in the target FIFO area 41 has exceeded the upper limit at time t41 as the number of NAND commands in the target FIFO area 41 increases, the NAND controller central unit 112 issues a first interrupt and sends the first interrupt to the CPU 12. In accordance with the first interrupt, the CPU 12 instructs the NAND controller front unit 111 to throttle host commands to be acquired from the target submission queue 221.

The NAND controller front unit 111 stops fetching of a host command from the target submission queue 221 in accordance with the instruction from the CPU 12. While fetching of a host command from the target submission queue 221 is stopped, any NAND command is not newly stored to the target FIFO area 41. Therefore, the number of NAND commands in the target FIFO area 41 decreases every time processing according to the NAND command is performed.

Then, when the number of NAND commands in the target FIFO area 41 becomes equal to or less than the lower limit at time t42, the NAND controller central unit 112 issues a second interrupt and sends the second interrupt to the CPU 12. In accordance with the second interrupt, the CPU 12 instructs the NAND controller front unit 111 to end throttling of host commands to be acquired from the target submission queue 221.

The NAND controller front unit 111 resumes fetching of a host command from the target submission queue 221 in accordance with the instruction from the CPU 12. After fetching of a host command from the target submission queue 221 is resumed, a NAND command is newly stored to the target FIFO area 41. Therefore, the number of NAND commands in the target FIFO area 41 decreases every time processing according to the NAND command stored in the target FIFO area 41 is performed, and increases every time a NAND command corresponding to a host command, which is fetched from the target submission queue 221, is stored.

When the number of NAND commands in the target FIFO area 41 has exceeded the lower limit after sending the second interrupt to the CPU 12, the NAND controller central unit 112 starts measurement of time 851 (first time period 851) from when the number of NAND commands in the target FIFO area 41 has exceeded the lower limit to when the number of NAND commands exceeds the upper limit, with use of the timer 14.

Then, when the number of NAND commands in the target FIFO area 41 has exceeded the upper limit at time t43, the NAND controller central unit 112 ends the measurement of the first time period 851. The NAND controller central unit 112 adjusts the lower limit on the basis of the measured first time period 851. More specifically, the NAND controller central unit 112 sets the first value as the lower limit when the first time period 851 is equal to or greater than the third threshold. When the first time period 851 is less than the third threshold, the NAND controller central unit 112 sets the second value, which is smaller than the first value, as the lower limit.

In addition, when the number of NAND commands in the target FIFO area 41 has exceeded the upper limit at time t43, the NAND controller central unit 112 issues the first interrupt again and sends the first interrupt to the CPU 12. In accordance with the first interrupt, the CPU 12 instructs the NAND controller front unit 111 to throttle host commands to be acquired from the target submission queue 221. The NAND controller front unit 111 stops fetching of a host command from the target submission queue 221 in accordance with the instruction from the CPU 12. While fetching of a host command from the target submission queue 221 is stopped, any NAND command is not newly stored to the target FIFO area 41. Therefore, the number of NAND commands in the target FIFO area 41 decreases every time processing according to the NAND command is performed.

As illustrated in the graph 85, in a case where the first value is set as the lower limit, since the number of NAND commands in the target FIFO area 41 becomes equal to or less than the lower limit at time t44, the NAND controller central unit 112 issues the second interrupt again and sends the second interrupt to the CPU 12. In accordance with the second interrupt, the CPU 12 instructs the NAND controller front unit 111 to end throttling of host commands to be acquired from the target submission queue 221. The NAND controller front unit 111 resumes fetching of a host command from the target submission queue 221 in accordance with the instruction from the CPU 12.

As illustrated in the graph 86, in a case where the second value is set as the lower limit, the number of NAND commands in the target FIFO area 41 becomes equal to or less than the lower limit at time t45 after time t44. When the number of NAND commands in the target FIFO area 41 becomes equal to or less than the lower limit, the NAND controller central unit 112 issues the second interrupt again and sends the second interrupt to the CPU 12. In accordance with the second interrupt, the CPU 12 instructs the NAND controller front unit 111 to end throttling of host commands to be acquired from the target submission queue 221. The NAND controller front unit 111 resumes fetching of a host command from the target submission queue 221 in accordance with the instruction from the CPU 12.

An interval from time t43 (when the first interrupt is issued) to time t44 (when the second interrupt is issued next in a case where the first value is set as the lower limit) is denoted as a third interrupt interval 852. An interval from time t43 (when the first interrupt is issued) to time t45 (when the second interrupt is issued next in a case where the second value is set as the lower limit) is denoted as a fourth interrupt interval 861. The fourth interrupt interval 861 is longer than the third interrupt interval 852. That is, by setting a smaller value as the lower limit, the interrupt interval can be lengthened.

In a case where the time (first time period) 851 from when the number of NAND commands in the target FIFO area 41 has exceeded the lower limit to when the number of NAND commands exceeds the upper limit is short, the interrupt interval can be lengthened by setting the small second value as the lower limit. As a result, it is possible to prevent start and end of throttling of host commands to be acquired from the target submission queue 221 from being repeatedly performed in a short time. In addition, the processing load by the CPU 12 according to the interrupt can be reduced.

Figure 12:
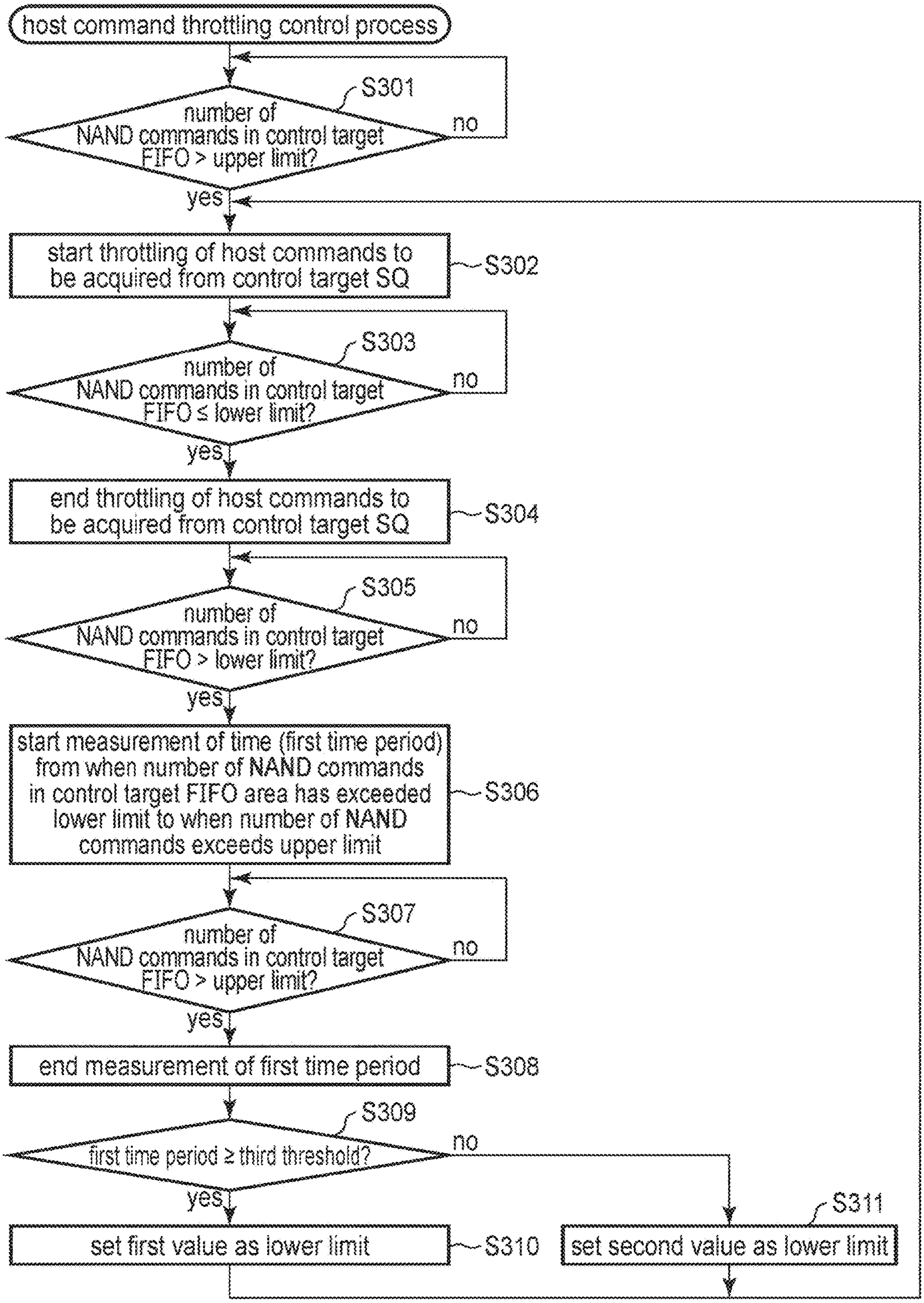
FIG. 12 is a flowchart illustrating an example of the procedure of a host command throttling control process executed in the memory system according to the second embodiment.

FIG. 12 is a flowchart illustrating an example of the procedure of a host command throttling control process executed by the controller 4.

First, the controller 4 determines whether the number of NAND commands in the control target FIFO area 41 has exceeded the upper limit (step S301). When the number of NAND commands in the control target FIFO area 41 is equal to or less than the upper limit (no in step S301), the processing by the controller 4 returns to step S301.

When the number of NAND commands in the control target FIFO area 41 has exceeded the upper limit (yes in step S301), the controller 4 starts throttling of host commands to be acquired from the control target submission queue 221 (step S302).

Next, the controller 4 determines whether the number of NAND commands in the control target FIFO area 41 becomes equal to or less than the lower limit (step S303). When the number of NAND commands in the control target FIFO area 41 exceeds the lower limit (no in step S303), the processing by the controller 4 returns to step S303.

When the number of NAND commands in the control target FIFO area 41 becomes equal to or less than the lower limit (yes in step S303), the controller 4 ends throttling of host commands to be acquired from the control target submission queue 221 (step S304).

Next, the controller 4 determines whether the number of NAND commands in the control target FIFO area 41 has exceeded the lower limit (step S305). When the number of NAND commands in the control target FIFO area 41 does not exceed the lower limit (no in step S305), the processing by the controller 4 returns to step S305.

When the number of NAND commands in the control target FIFO area 41 has exceeded the lower limit (yes in step S305), the controller 4 starts measurement of time (first time period) from when the number of NAND commands in the control target FIFO area 41 has exceeded the lower limit to when the number of NAND commands exceeds the upper limit (step S306). Measurement of the first time period is performed by using, for example, the timer 14. Then, the controller 4 determines whether the number of NAND commands in the control target FIFO area 41 has exceeded the upper limit (step S307). When the number of NAND commands in the control target FIFO area 41 is equal to or less than the upper limit (no in step S307), the processing by the controller 4 returns to step S307. When the number of NAND commands in the control target FIFO area 41 has exceeded the upper limit (yes in step S307), the controller 4 ends the measurement of the first time period (step S308).

The controller 4 determines whether the measured first time period is equal to or greater than the third threshold (step S309). When the measured first time period is equal to or greater than the third threshold (yes in step S309), the controller 4 sets the first value as the lower limit (step S310), and the processing by the controller 4 proceeds to step S302. The set first value is the lower limit used for the next determination whether throttling of host commands to be acquired from the control target submission queue 221 is ended. That is, as the processing by the controller 4 proceeds to step S302, the controller 4 starts throttling of host commands to be acquired from the control target submission queue 221, and then ends throttling of host commands to be acquired from the control target submission queue 221 on the basis of the first value.

When the measured first time period is less than the third threshold (no in step S309), the controller 4 sets the second value, which is smaller than the first value, as the lower limit (step S311), and the processing by the controller 4 proceeds to step S302. The set second value is the lower limit used for the next determination whether throttling of host commands to be acquired from the control target submission queue 221 is ended. That is, as the processing by the controller 4 proceeds to step S302, the controller 4 starts throttling of host commands to be acquired from the control target submission queue 221, and then ends throttling of host commands to be acquired from the control target submission queue 221 on the basis of the second value.

According to the host command throttling control process described above, the controller 4 sets the lower limit on the basis of the time (first time period) from when the number of NAND commands in the control target FIFO area 41 has exceeded the lower limit to when the number of NAND commands exceeds the upper limit. The controller 4 controls end of throttling of host commands to be acquired from the control target submission queue 221 in accordance with the number of NAND commands in the control target FIFO area 41 and the set lower limit.

Specifically, when the first time period is equal to or greater than the third threshold, the controller 4 sets the large first value as the lower limit. On the other hand, when the first time period is less than the third threshold, the controller 4 sets the small second value as the lower limit.

When the number of NAND commands in the control target FIFO area 41 has exceeded the upper limit, the controller 4 starts throttling of host commands to be acquired from the control target submission queue 221. Then, the controller 4 ends throttling of host commands to be acquired from the control target submission queue 221 when the number of NAND commands in the control target FIFO area 41 becomes equal to or less than the lower limit that is either the first value or the second.

In a case where the second value is set as the lower limit, the time from start to end of throttling of host commands to be acquired from the control target submission queue 221 is longer than time in a case where the first value is set as the lower limit. As a result, it is possible to prevent start and end of throttling of host commands to be acquired from the control target submission queue 221 from being repeatedly performed in a short time. More specifically, it is possible to reduce the frequency of issuing an interrupt for controlling start and end of throttling of host commands to be acquired from the control target submission queue 221. Therefore, in the controller 4, the processing load for controlling acquisition of host commands from the control target submission queue 221 (for example, the processing load by the CPU 12 that performs processing according to an interrupt) can be reduced. Therefore, the memory system 3 can efficiently control reception of a host command from the host 2.

In step S310, the controller 4 may set not the first value but a value larger than the currently set value as the lower limit. In step S311, the controller 4 may set not the second value but a value smaller than the currently set value as the lower limit.

Alternatively, instead of the procedures of steps S309, S310, and S311, the controller 4 may perform a procedure of setting any one of three or more values as the lower limit on the basis of the comparison result using the first time period and two or more thresholds. For example, the controller 4 sets the first value as the lower limit when the first time period is equal to or greater than the third threshold. The controller 4 sets the second value as the lower limit when the first time period is less than the third threshold and is equal to or more than a fourth threshold. The controller 4 sets a third value as the lower limit when the first time period is less than the fourth threshold. The fourth threshold is smaller than the third threshold. The third value is smaller than the second value.

As described above, as a method of adjusting a value set as the lower limit on the basis of the first time period, various methods may be used according to the configuration, the usage status, and the like of the memory system 3.

As described above, according to the first and the second embodiments, reception of a request from the host 2 can be efficiently controlled. The NAND controller front unit 111 acquires a request (for example, a host command) from a first submission queue 221 of the submission queues 221. The NAND controller central unit 112 generates one or more commands (for example, NAND commands) to be executed by the NAND flash memory 5 in accordance with the acquired request. The NAND controller central unit 112 stores the generated commands to a first FIFO area 41 of the FIFO areas 41. The NAND controller central unit 112 causes the NAND flash memory 5 to perform a process corresponding to each of one or more commands that are stored in the first FIFO area 41. The NAND controller central unit 112 controls throttling of acquisition of requests from the first submission queue 221 in accordance with the number of commands stored in the first FIFO area 41 and the number of requests stored in the first submission queue 221.

As a result, it is possible to efficiently control acquisition of requests from each of the submission queues 221 while maintaining a balance in which requests are processed among the submission queues 221.

Each of various functions described in the first and second embodiments may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiments may be realized in a processing circuit.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system comprising:
a nonvolatile memory;
a storage area; and
a controller configured to:
acquire a request from a first submission queue included in a host;
generate one or more commands to be executed by the nonvolatile memory in accordance with the acquired request;
store the generated one or more commands to the storage area; and
cause the nonvolatile memory to execute a process according to each of the one or more commands stored in the storage area, wherein
the controller is further configured to:
acquire, an amount of first time from when a number of commands stored in the storage area has exceeded a lower limit to when the number of commands stored in the storage area exceeds an upper limit, the upper limit being larger than the lower limit; and
control throttling of acquisition of requests from the first submission queue at least in accordance with the amount of first time.

2. The memory system according to claim 1, wherein
the controller is configured to control throttling of acquisition of requests from the first submission queue further in accordance with the number of commands stored in the storage area.

3. The memory system according to claim 2, wherein
the controller is further configured to:
start throttling of acquisition of requests from the first submission queue when the number of commands stored in the storage area has exceeded the upper limit;
end throttling of acquisition of requests from the first submission queue when the number of commands stored in the storage area becomes equal to or less than the lower limit; and
after ending the throttling, acquire an amount of second time from when the number of commands stored in the storage area has exceeded the lower limit again to when the number of commands stored in the storage area exceeds the upper limit again.

4. The memory system according to claim 3, wherein
the controller is configured to:
set a first value as the lower limit when the amount of second time is equal to or more than a third threshold; and
set a second value, which is smaller than the first value, as the lower limit when the amount of second time is less than the third threshold.

5. The memory system according to claim 4, wherein
the controller is configured to:
after either the first value or the second value is set as the lower limit,
start throttling of acquisition of requests from the first submission queue again when the number of commands stored in the storage area has exceeded the upper limit; and
end throttling of acquisition of requests from the first submission queue when the number of commands stored in the storage area becomes equal to or less than the lower limit.

6. The memory system according claim 1, wherein
the controller includes a processor and a first circuit, and wherein the controller is configured to control throttling of acquisition of requests from the first submission queue, by using an interrupt issued from the first circuit to the processor.

7. The memory system according to claim 1, wherein the controller is configured to:

start throttling of acquisition of requests from the first submission queue by stopping fetching of requests from the submission queue; and end throttling of acquisition of requests from the first submission queue by resuming fetching of requests from the first submission queue.

8. The memory system according to claim 1, wherein the number of commands stored in the storage area decreases in accordance with the process according to each of the one or more commands being executed.

9. The memory system according to claim 1, wherein the controller includes a submission queue head pointer and a submission queue tail pointer, and wherein the controller is further configured to:

determine a number of requests stored in the first submission queue in accordance with a difference between the submission queue head pointer and the submission queue tail pointer; and control throttling of acquisition of requests from the first submission queue further in accordance with the requests stored in the first submission queue.

10. The memory system according to claim 1, wherein the first submission queue is one of a plurality of submission queues included in the host, and wherein the controller is configured to control throttling of acquisition of requests from each of the plurality of submission queues independently.

11. A method of operating a memory system that includes a nonvolatile memory and a storage area, the method comprising:

acquiring a request from a first submission queue included in a host;

generating one or more commands to be executed by the nonvolatile memory in accordance with the acquired request;

storing the generated one or more commands to the storage area;

causing the nonvolatile memory to execute a process according to each of the one or more commands stored in the storage area;

acquiring, an amount of first time from when a number of commands stored in the storage area has exceeded a lower limit to when the number of commands stored in the storage area exceeds an upper limit, the upper limit being larger than the lower limit; and controlling throttling of acquisition of requests from the first submission queue at least in accordance with the amount of first time.

12. The method according to claim 11, wherein throttling of acquisition of requests from the first submission queue is controlled further in accordance with the number of commands stored in the storage area.

13. The method according to claim 12, further comprising:

determining that the number of commands stored in the storage area has exceeded the upper limit;

in response to determining that the number of commands stored in the storage area has exceeded the upper limit, starting throttling of acquisition of requests from the first submission queue;

determining that the number of commands stored in the storage area becomes equal to or less than the lower limit;

in response to determining that the number of commands stored in the storage area becomes equal to or less than the lower limit, ending throttling of acquisition of requests from the first submission queue; and after ending the throttling, acquiring an amount of second time from when the number of commands stored in the storage area has exceeded the lower limit again to when the number of commands stored in the storage area exceeds the upper limit again.

14. The method according to claim 13, further comprising:

setting either a first value or a second value which is smaller than the first value, as the lower limit depending on whether the amount of second time is equal to or more than a third threshold.

15. The method according to claim 14, further comprising:

after either the first value or the second value is set as the lower limit, determining that the number of commands stored in the storage area has exceeded the upper limit;

in response to determining that the number of commands stored in the storage area has exceeded the upper limit, starting throttling of acquisition of requests from the first submission queue again;

determining that the number of commands stored in the storage area becomes equal to or less than the lower limit; and in response to determining that the number of commands stored in the storage area becomes equal to or less than the lower limit, ending throttling of acquisition of requests from the first submission queue.

16. The method according claim 11, wherein the memory system further includes a processor and a first circuit, and throttling of acquisition of requests from the first submission queue is controlled by using an interrupt issued from the first circuit to the processor.

17. The method according to claim 11, wherein throttling of acquisition of requests from the first submission queue is started by stopping fetching of requests from the submission queue, and throttling of acquisition of requests from the first submission queue is ended by resuming fetching of requests from the first submission queue.

18. The method according to claim 11, wherein the number of commands stored in the storage area decreases in accordance with the process according to each of the one or more commands being executed.

19. The method according to claim 11, wherein the memory system further includes a submission queue head pointer and a submission queue tail pointer, and the method further comprises:

determining a number of requests stored in the first submission queue in accordance with a difference between the submission queue head pointer and the submission queue tail pointer, wherein throttling of acquisition of requests from the first submission queue is controlled further in accordance with the requests stored in the first submission queue.

20. The method according to claim 11, wherein the first submission queue is one of a plurality of submission queues included in the host, and throttling of acquisition of requests from each of the plurality of submission queues is controlled independently.

* * * * *